United States Patent [19]
Itoh et al.

[11] Patent Number: 6,075,941
[45] Date of Patent: Jun. 13, 2000

[54] MICROCOMPUTER

[75] Inventors: Sakae Itoh; Teruaki Kanzaki, both of Tokyo; Tadayuki Akatsuki, Hyogo; Tatsuya Sakai, Kanagawa; Tsutomu Numata, Kanagawa; Yasuhiro Nakamura, Kanagawa, all of Japan

[73] Assignees: International Business Machines Corporation, Armonk, N.Y.; Mitsubishi Electric System LSI Design Corporation, Itami; Mitsubishi Denki Kabushiki Kaisha, Tokyo, both of Japan

[21] Appl. No.: 09/010,538

[22] Filed: Jan. 22, 1998

[30] Foreign Application Priority Data

Jan. 29, 1997 [JP] Japan ..................................... 9-015743

[51] Int. Cl.⁷ .................................................. G06F 9/445
[52] U.S. Cl. ............................................ 395/704; 714/38
[58] Field of Search ........................... 395/704; 711/103, 711/227; 714/29, 30, 38

[56] References Cited

U.S. PATENT DOCUMENTS

| | | | |
|---|---|---|---|
| 5,550,997 | 8/1996 | Ip et al. ................................... | 711/103 |
| 5,560,036 | 9/1996 | Yoshida ................................... | 395/568 |
| 5,621,886 | 4/1997 | Alpert et al. ............................ | 364/267 |
| 5,623,604 | 4/1997 | Russell et al. .......................... | 395/712 |
| 5,657,442 | 8/1997 | Groves ..................................... | 345/429 |
| 5,701,492 | 12/1997 | Wadsworth et al. ..................... | 395/712 |
| 5,757,690 | 5/1998 | McMahon ................................ | 365/104 |
| 5,761,482 | 6/1998 | Matsui et al. ........................... | 395/500 |
| 5,768,497 | 6/1998 | Uemura et al. .......................... | 714/28 |
| 5,768,563 | 6/1998 | Porter et al. ............................ | 395/500 |
| 5,802,268 | 9/1998 | Fisher et al. ............................ | 714/25 |
| 5,838,898 | 11/1998 | Sawai ................................... | 395/185.03 |
| 5,850,562 | 12/1998 | Crump et al. ...................... | 395/183.16 |
| 5,857,094 | 1/1999 | Nemirovsky ............................ | 395/500 |
| 5,881,288 | 3/1999 | Sumi et al. ............................. | 395/704 |

OTHER PUBLICATIONS

Hand, Tom, Debugging Embedded Systems Implemented in C, 1990, pp. 17–22.
Bruegge, Bernd, A Framework for Dynamic Program Analyzers, 1993, pp. 65–82.

Primary Examiner—Tariq R. Hafiz
Assistant Examiner—John Q. Chavis
Attorney, Agent, or Firm—Burns, Doane, Swecker & Mathis, LLP

[57] ABSTRACT

A microcomputer contains an electrically erasable flash memory for storing a program under development and a debugging circuit 7 having a dedicated input/output terminal for connection to an external ICE 14, and the debugging circuit 7 has a function of communication with a CPU 1, a function of communication with the ICE 14, a function of tracing the operating condition of the CPU 1, a break function of generating a debug interrupt, a function of writing a program code from the ICE 14 into the flash memory 6 and a function of sending the contents of the flash memory 6 to the ICE 14.

4 Claims, 19 Drawing Sheets

FIG.4(1)

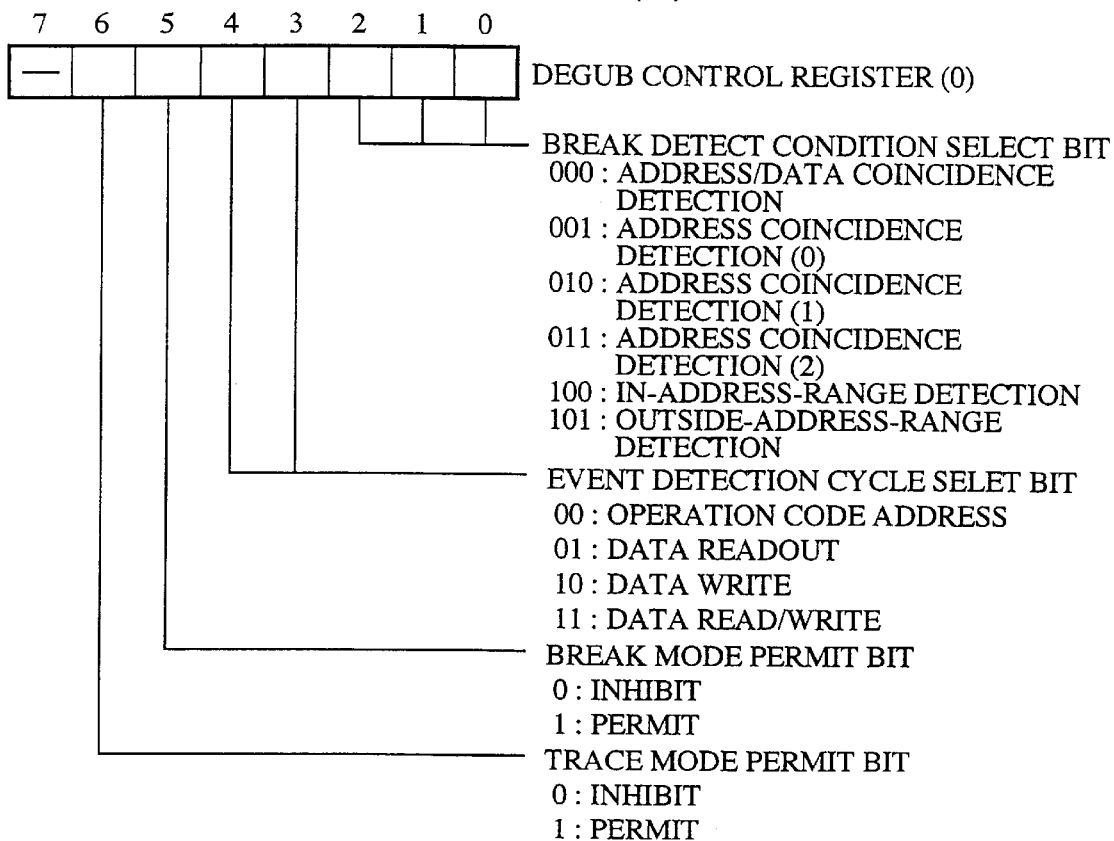

DEGUB CONTROL REGISTER (0)

BREAK DETECT CONDITION SELECT BIT
000 : ADDRESS/DATA COINCIDENCE DETECTION
001 : ADDRESS COINCIDENCE DETECTION (0)
010 : ADDRESS COINCIDENCE DETECTION (1)
011 : ADDRESS COINCIDENCE DETECTION (2)
100 : IN-ADDRESS-RANGE DETECTION
101 : OUTSIDE-ADDRESS-RANGE DETECTION

EVENT DETECTION CYCLE SELET BIT
00 : OPERATION CODE ADDRESS
01 : DATA READOUT
10 : DATA WRITE
11 : DATA READ/WRITE

BREAK MODE PERMIT BIT
0 : INHIBIT
1 : PERMIT

TRACE MODE PERMIT BIT
0 : INHIBIT
1 : PERMIT

FIG.4(2)

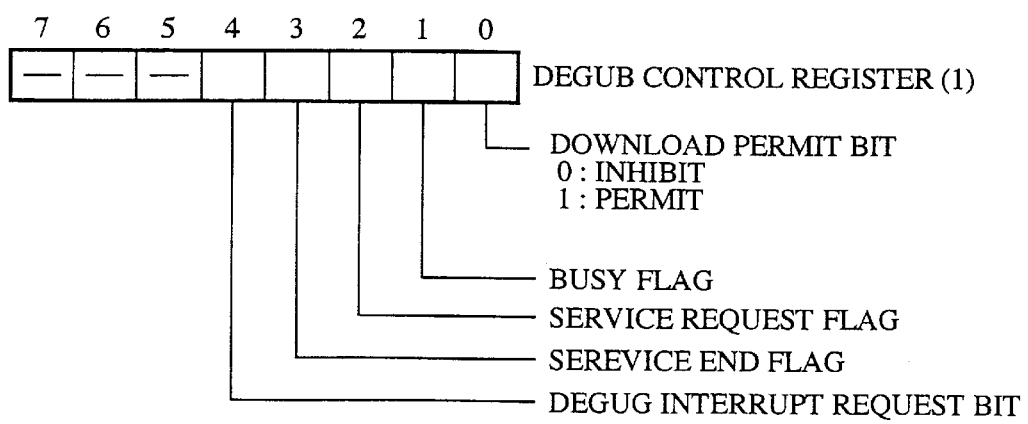

DEGUB CONTROL REGISTER (1)

DOWNLOAD PERMIT BIT
0 : INHIBIT
1 : PERMIT

BUSY FLAG

SERVICE REQUEST FLAG

SEREVICE END FLAG

DEGUG INTERRUPT REQUEST BIT

FIG.5

| ADDRESS | REGISTER |
|---|---|
| 66H | DEGUG CONTROL REGISTER (0) |
| 67H | DEGUG CONTROL REGISTER (1) |
| 68H | ADDRESS COMPARISON REGISTER (0) "L" |
| 69H | ADDRESS COMPARISON REGISTER (0) "M" |
| 6AH | ADDRESS COMPARISON REGISTER (0) "H" |
| 6BH | ADDRESS COMPARISON REGISTER (1) "L" |
| 6CH | ADDRESS COMPARISON REGISTER (1) "M" |
| 6DH | ADDRESS COMPARISON REGISTER (1) "H" |
| 6EH | DATA COMPARISON REGISTER "L" |
| 6FH | DATA COMPARISON REGISTER "H" |
| 70H | DEBUG REGISTER (0) |
| 71H | DEBUG REGISTER (1) |
| 72H | DEBUG REGISTER (2) |
| 73H | DEBUG REGISTER (3) |
| 74H | DEBUG REGISTER (4) |
| 75H | DEBUG REGISTER (5) |
| 76H | DEBUG REGISTER (6) |
| 77H | DEBUG REGISTER (7) |

REGISTER READOUT COMMAND INPUT | REGISTER READ-OUT DATA OUTPUT

| BIT CONFIGURATION | | 7 | 6 | 5 | 4 | 3 | 2 | 1 | 0 |
|---|---|---|---|---|---|---|---|---|---|
| REGISTER READOUT | | 0 | 0 | 1 | LOW-ORDER FIVE BITS OF 66H~77H | | | | |
| WRITING TO REGISTERS | DEBUG CONTROL REGISTER (0) | 1 | | | DEBUG CONTROL REGISTER (0) WRITE DATA | | | | |
| | DEBUG CONTROL REGISTER (1) | 0 | 1 | | DEBUG CONTROL REGISTER (1) WRITE DATA | | | | |
| | OTHERS | 0 | 0 | 0 | LOW-ORDER FIVE BITS OF ADDRESSES 68~77 | | | | |

FIG. 10

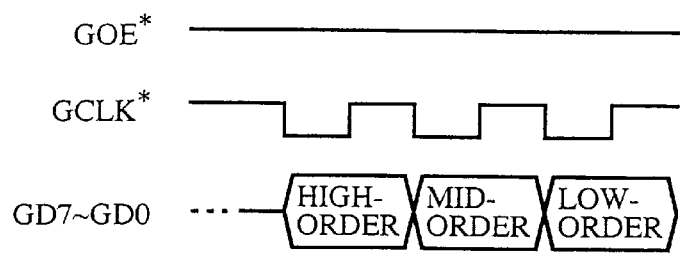

FIG. 11

|  |  | CONTENTS | BIT 7 | 6 | 5 | 4 |
|---|---|---|---|---|---|---|
| CODE | | OPERATION CODE ADDRESS OF BRANCH INSTRUCTION | 0 | 0 | 0 | 0 |
| | | OPERATION CODE ADDRESS AFTER EXECUTION OF BRANCH INSTRUCTION | | | 0 | 1 |
| | | OPERATION CODE ADDRESS AT INTERRUPT REQUEST | | | 1 | 0 |
| | | JUMP ADDRESS AFTER RESETTING | | | 1 | 1 |
| DATA | READ | BYTE-ACCESS EVEN ADDRESS | 0 | 1 | 0 | 1 |
| | | BYTE-ACCESS ODD ADDRESS | | | 1 | 0 |
| | | WORD-ACCESS EVEN/ODD ADDRESS | | | 1 | 1 |
| | WRITE | BYTE-ACCESS EVEN ADDRESS | 1 | 0 | 0 | 1 |
| | | BYTE-ACCESS ODD ADDRESS | | | 1 | 0 |
| | | WORD-ACCESS EVEN/ODD ADDRESS | | | 1 | 1 |
| DATA (DATA TRANSFER INSTRUCTION) | | BYTE-ACCESS EVEN ADDRESS | 1 | 1 | 0 | 1 |
| | | BYTE-ACCESS ODD ADDRESS | | | 1 | 0 |
| | | WORD-ACCESS EVEN/ODD ADDRESS | | | 1 | 1 |
| WHEN GOE* TERMINAL INPUT IS SWITCHED FROM "L" OR "H" | | | 0 | 1 | 0 | 0 |
| DURING BREAK DETECTION | | | 1 | 0 | 0 | 0 |

MICROCOMPUTER

This application claims priority under 35 U.S.C. §§ 119 and/or 365 to Application No. 15743/97 filed in Japan on Jan. 29, 1997; the entire content of which is hereby incorporated by reference.

BACKGROUND OF THE INVENTION

1. Field of the Invention

The present invention relates generally to a microcomputer which has a built-in read-only memory (hereinafter referred to as a ROM) for storing a program for use with a central processing unit (hereinafter referred to as a CPU) and, more particularly, to a microcomputer which allows ease in developing program that is stored in the ROM.

2. Description of the Prior Art

FIG. 21 illustrates in block form the configuration of a conventional microcomputer having a memory built-in. In FIG. 21, reference numeral 1 denotes a CPU of the microcomputer, 2 a ROM for storing programs that the CPU uses, 3 a random access memory (hereinafter referred to as a RAM), 4 peripheral functions of the microcomputer, and 5 an internal bus which connects these parts, 5a being an address bus, 5b a data bus and 5c a control bus.

The operation of this conventional microcomputer will be described below.

The CPU 1 reads thereinto program from the ROM 2 via the internal bus 5 for actuation of the microcomputer by sequential execution of the program. With the progress of the program execution, the CPU 1 exchanges data between it and the RAM 3 or peripheral functions 4 via the internal bus 5, conducting various data processing.

Incidentally, the ROM 2 is a read-only memory and programs are written therein during manufacture and cannot be rewritten afterward. Accordingly, it is customary in the art for a user to adopt such a scheme as mentioned below in his programming and debugging during program development.

FIG. 22 is a block diagram showing a program development environment for developing programs that are stored in the ROM 2 of the microcomputer. The parts corresponding to those in FIG. 21 are identified by the same reference numerals and no description will be repeated. In FIG. 22, reference numeral 11 denotes a microcomputer whose configuration is shown in FIG. 21, 12 an external bus leading to the internal bus 5 of the microcomputer 11, 13 an emulation memory connected via the external bus 12 to the microcomputer 11 and housed together therewith in a part called a pod, 14 an emulator (hereinafter referred to as an ICE) connected to the external bus 12 connected to the microcomputer 11, 15 a host computer formed by a personal computer or engineering working station (hereinafter referred to as an EWS) connected to the ICE 14, and 16 a user board, on which each terminal of the microcomputer 11 led out of the pod by a cable is connected to a socket placed in the space where the microcomputer 11 is mounted.

Incidentally, the microcomputer 11 has a special mode for use only in program development; it is necessary to prepare facilities of prohibiting access to the built-in ROM 2 and leading out the internal bus 5 to the outside in that mode. An emulation memory 13, formed by a read/write memory (usually a static RAM), is connected to the external bus 12 for emulation of the ROM 2. That is, there is provided outside the microcomputer 11, as a substitute for the ROM 2, the emulation memory 13 which permits reading therefrom and writing thereto through the external bus 12. The CPU 1 of the microcomputer 11 runs the program under development which is loaded in the emulation memory 13 and, if bugs are found, fixes them one by one to complete the program.

A user normally describes a program in C, assembler or similar language on the host computer 15. The program thus described is compiled into a file of a hexadecimal format, which is transferred to the ICE 14. The ICE 14 is connected to the external bus 12 interconnecting the microcomputer 11 and the emulation memory 13 and downloads program codes from the host computer 15 into the emulation memory 13 via the external bus 12. The ICE 14 is connected not only to the external bus 12 but also to the microcomputer 11 by control signals (a reset input, a debugging interruption request input, etc.) for controlling the operation of the microcomputer 11 during debugging and monitor signals for monitoring the operation of the microcomputer 11 from the outside. Upon downloading the program to the emulation memory 12, the ICE 14 resets the microcomputer 11 to start it.

Then the microcomputer 11 begins execution of the program on the emulation memory 13. Signals on the external bus 12 and the monitor signals during the program execution are temporarily stored in a trace memory in the ICE 14. The trace memory is accessible from the host computer 15 in real time, enabling the user to check the state of execution of his developed program. The ICE 14 is equipped with a function of monitoring the signals on the external bus 12 and the monitor signals at any time, a function of suspending the execution of the program through generation of a debugging dedicated interrupt when the state of operation of the microcomputer 11 meets a preset condition, and a function of checking and modifying the contents of internal registers and memories of the microcomputer 11 in the suspended state. Making full use of such functions, the user makes a check to see if his developed program runs as intended and, if not, then tracks down the cause of errors; in the case of programming errors, he fixes the program on the host computer 15 and then downloads it again to the emulation memory 13 via the ICE 14. The program development work proceeds while repeating such operations.

Because of such a configuration as described above, the conventional microcomputer needs to have a special debugging dedicated mode such as a function of inhibiting access to the built-in ROM 2 and leading out the internal bus 5 to the outside for external installation of the emulation memory 13 and a function of allowing a debugging dedicated interruption input or outputting monitor signals for notifying the ICE 14 of the operating conditions in the microcomputer 11; in some instances, it is necessary to prepare a program development dedicated chip without the ROM 2.

Furthermore, the ROM 2 is built in the chip and hence is accessible at high speed, but an access to the external emulation memory 13 at the same speed as that for accessing the ROM 2 requires an expensive and high-speed memory. Since the operation in the chip is becoming increasingly faster with recent improvements in semiconductor processes, accessing the externally connected emulation memory 13 at the same speed as that for accessing the built-in ROM 2 is becoming more and more difficult. Moreover, the ICE 14 monitors signals on the internal bus 5 of the microcomputer 11 and monitor signals therefrom and, upon detection of a preset state, suspends the program execution by sending a debug interruption request to the microcomputer 11 (a break function), but a time delay occurs in requesting the interruption after the state detection, occasionally resulting in the program having al ready run past the initially set point when the program execution is actually suspended after acceptance of the interruption. Besides, since each terminal of the microcomputer 11 is led out of the pod by a cable or the like and connected to the socket of the user board 16, the situation may sometimes arise where, under the influence of a signal transmission delay by the cable or the like, the timing for input and output signals is not the same as in the case where the microcomputer 11 is mounted directly on the user board 16.

SUMMARY OF THE INVENTION

It is therefore an object of the present invention to provide a microcomputer which has a built-in debug circuit equipped with various facilities and functions for program debugging and is capable of using, as an emulation memory, an electrically erasable flash memory mounted on the same chip as the debugging circuit.

To attain the above objective, according to a first aspect of the present invention, there is provided a microcomputer which has an electrically erasable flash memory for storing a program under development and a dedicated I/O terminal for connection to an external ICE and further has a built-in debugging circuit which possesses a CPU communication facility, an ICE communication facility, a CPU operating state tracing facility, a break function for causing a debug dedicated interruption, a function of writing program codes from the ICE into the flash memory and a function of sending the contents of the flash memory to the ICE. With this configuration, the built-in flash memory can be used as an emulation memory and is accessible at the same speed as that for accessing the built-in ROM even if the operating speed in the chip increases with improvements in the semiconductor process—this avoids the necessity of external installation of a costly, high-speed memory as the emulation memory. In addition to this, the microcomputer need not be equipped with a special mode for debugging, such as facilities of prohibiting access to the built-in ROM, leading out the internal bus to the outside for external installation of the emulation memory, allowing the debugging dedicated interruption input and outputting monitor signals for the ICE to detect the operating state in the microcomputer. Moreover, the microcomputer has a break function in its chip by which, upon detection of a preset event, a debug interrupt can immediately be generated and hence the execution of the user program can be suspended without any delay in causing the break. Besides, the microcomputer can be connected directly to the user board so that only signals necessary for debugging are applied via connector to the ICE—this precludes the influence of the signal delay by the cable, permitting development/debugging of the program under conditions closer to the package configuration of a completed product or microcomputer.

According to a second aspect of the present invention there is provided a microcomputer in which the dedicated I/O terminal for connecting a built-in debugging circuit to the external ICE comprises a data terminal through which data is transmitted in two ways, a clock terminal through which a clock for establishing synchronization between data to be exchanged is sent in two ways, and a control terminal for determining the direction of propagation of the signals at the data terminal and the clock terminal. This configuration minimizes the number of signal lines between the ICE and the debugging circuit.

According to a third aspect of the present invention, there is provided a microcomputer which has a configuration in which if a bug is found in a program stored in an unreloadable or unrewritable ROM, a debug interrupt is generated when the effective address reaches the address of the program portion where the bug is present and this failing program portion is bypassed and substituted with a separately prepared correct one. With this configuration, it is possible to avoid the risk of discarding the completed product even if a bug is found in the program written in the ROM after completion.

According to a fourth aspect of the present invention, there is provided a microcomputer which is configured so that when the program execution by the CPU falls outside an anticipated address range, the debugging circuit generates a debug interrupt to detect a runaway. This configuration permits an immediate detection of the runaway unlike in the prior art employing a monitoring timer, making an early detection of the runaway and an early recovery therefrom.

BRIEF DESCRIPTION OF THE DRAWINGS

Other objects, features and advantages of the present invention will become more apparent from the following description taken in conjunction with the accompanying drawings, in which:

FIGS. 4(1) and 4(2) are explanatory diagrams each showing the bit configuration of a respective debug control register in Embodiment 1 of the present invention;

FIG. 5 is an explanatory diagram showing the address location of each register in a debugging circuit in Embodiment 1 of the present invention;

FIG. 10 is a timing chart showing an example of a trace output by code tracing in Embodiment 1 of the present invention;

FIG. 11 is an explanatory diagram showing the format of a trace attribute in Embodiment 1 of the present invention;

DETAILED DESCRIPTION OF THE PREFERRED EMBODIMENTS

A detailed description will be given, with reference to the accompanying drawings, of the preferred embodiments of the present invention.

Embodiment 1

Figure 1:
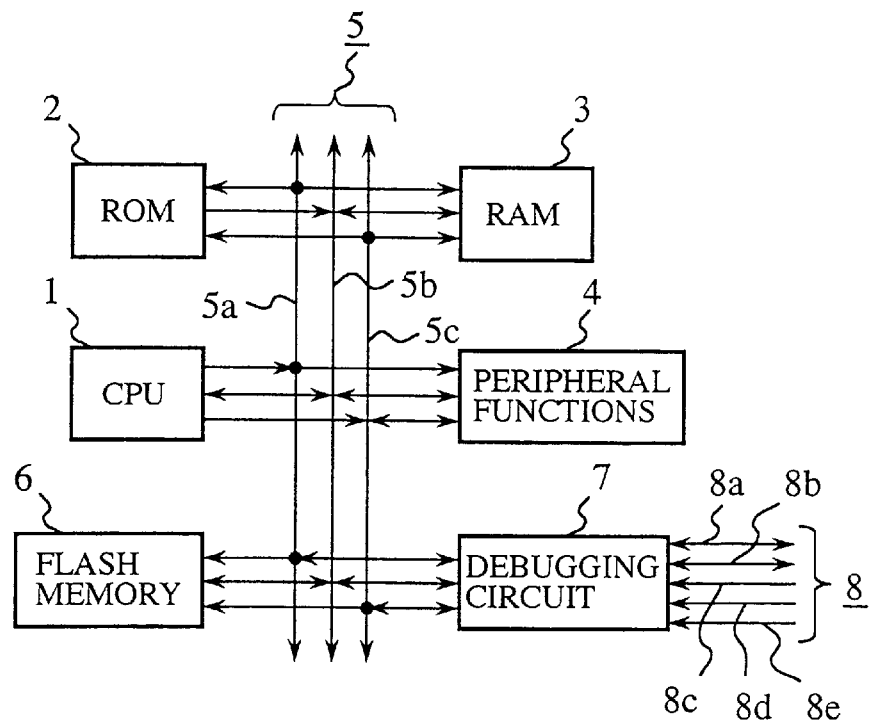
FIG. 1 is a block diagram illustrating the configuration of the memory built-in microcomputer according to Embodiment 1 of the present invention.
Figure 21:
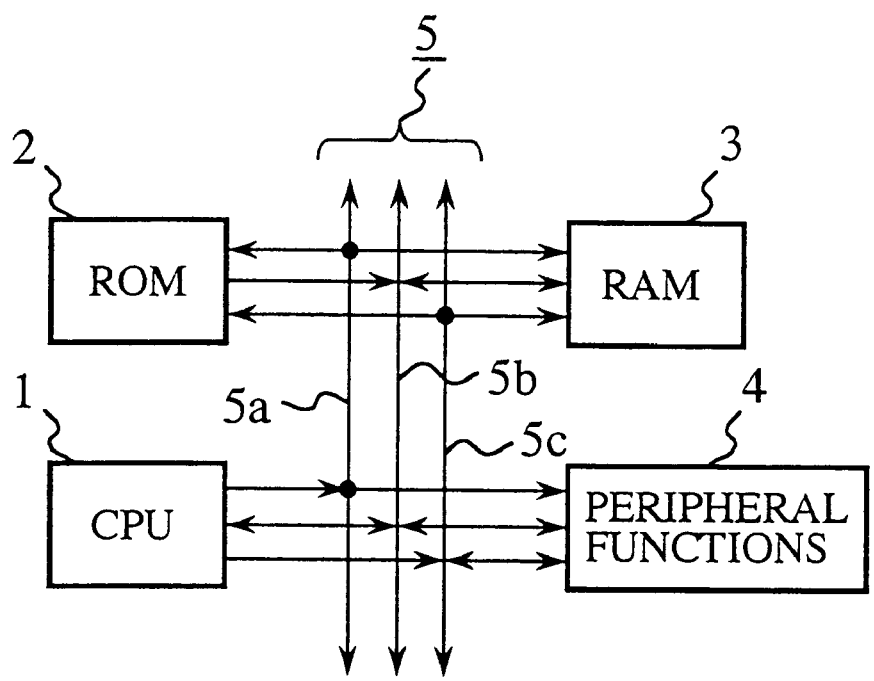
FIG. 21 is a block diagram illustrating the configuration of a conventional memory built-in microcomputer.
Figure 22:
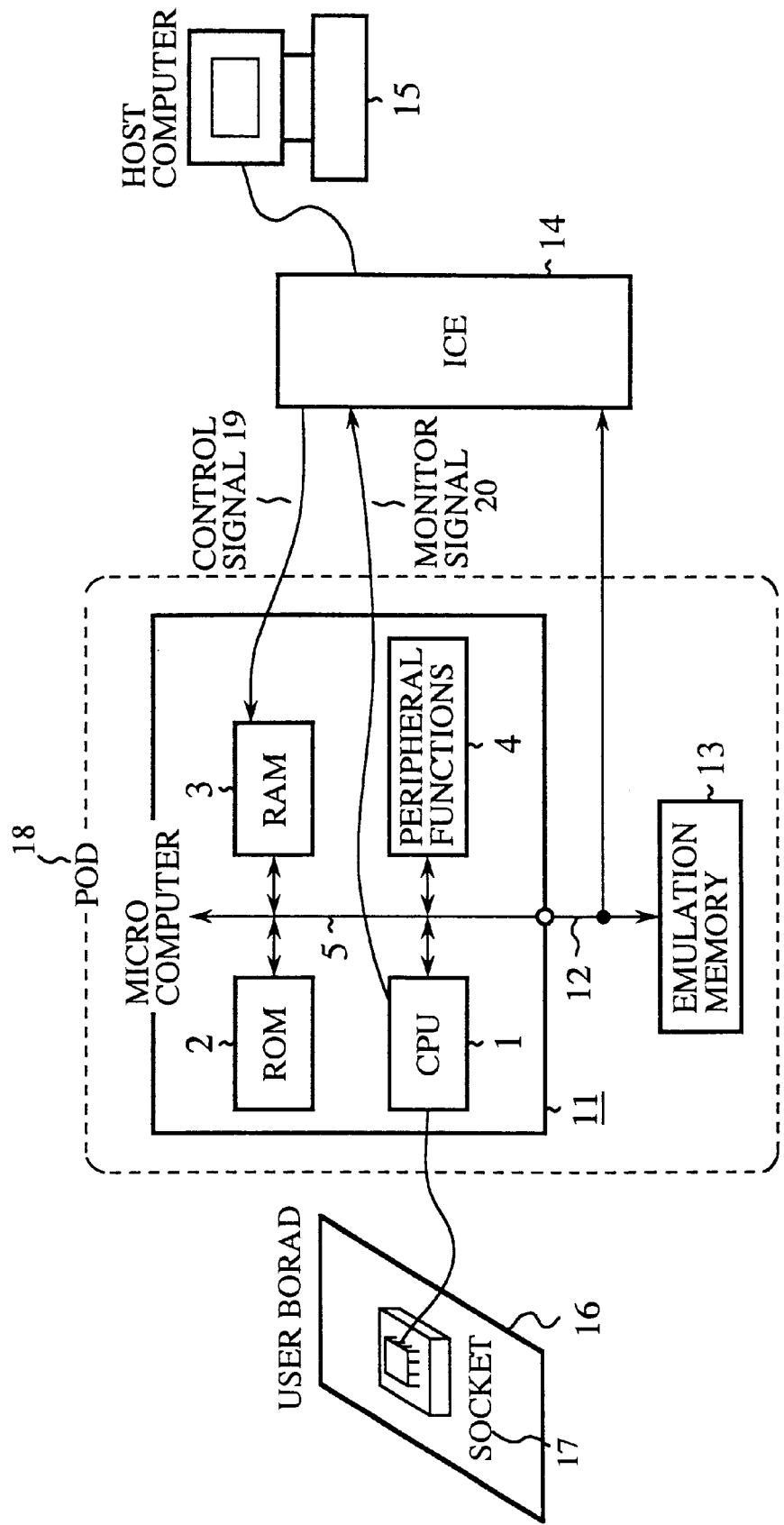
FIG. 22 is a block diagram showing the development environments for a program that is stored in a ROM of the conventional microcomputer.

FIG. 1 illustrates in block form the configuration of a memory built-in microcomputer according to embodiment 1 of the present invention. FIG. reference numeral 1 denotes a CPU which assumes complete control of the microcomputer, 2 a ROM in which to store a program for operating the CPU 1, 3 a RAM which the CPU 1 uses to execute the program stored in the ROM 2, 4 peripheral functions of the microcomputer such as a timer, analog-to-digital converter and a serial input/output circuit, 5 an internal bus interconnecting the CPU 1, the ROM 2, the RAM 3 and the peripheral functions 4, 5a an address bus forming the internal bus, 5b a data bus, and 5c a control bus. These parts are the same as those of the conventional microcomputer marked with the same reference numerals in FIG. 21.

Reference numeral 6 denotes an electrically erasable flash memory which stores an under-development version of the program to be stored in the ROM 2 and is used as an emulation memory during program development; 7 denotes a debugging circuit which is connected via the internal bus 5 to the CPU 1 and has a facility of communication with the CPU 1, a facility of communication with an ICE connected to the outside of the microcomputer, a facility of tracing the operating state of the CPU 1, a break facility of generating a dedicated debug interrupt and a download facility of performing read/program/erase of the flash memory 6; and 8 denotes a dedicated I/O terminal through which the debugging circuit 7 and the external ICE are interconnected and is made up of a GD bus 8a (GD7 to GD0) as a data terminal for sending therethrough data in two directions, a GCLK* terminal 8b as a clock terminal for sending therethrough clocks in two directions to establish synchronization between the data to be exchanged, and control terminals such as a GOE* terminal 8c for determining the direction of propagation of the signals at the GD bus 8a and the GCLK* terminal 8b, a Vpp terminal 8d and RESET* terminal 8e.

Figure 2:
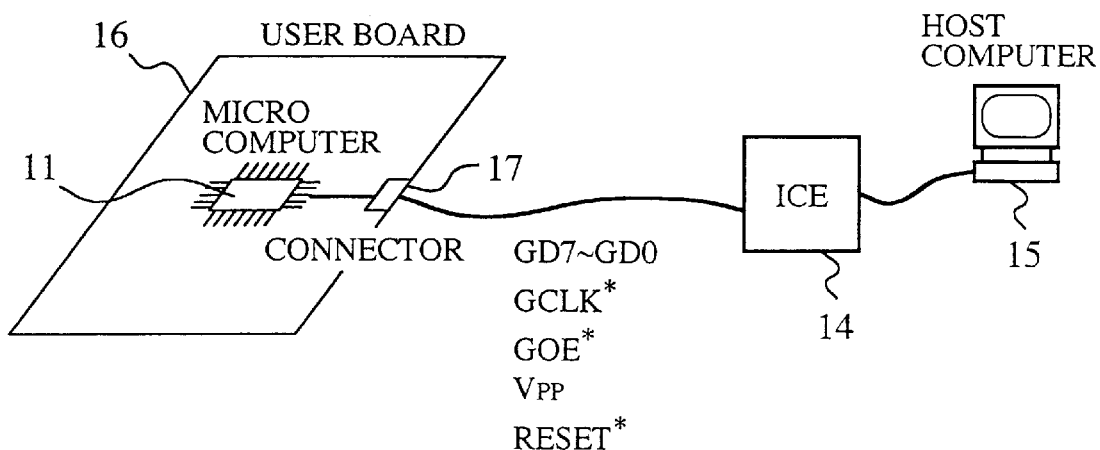
FIG. 2 is a block diagram showing development environments for a program that is stored in a ROM of the microcomputer according to Embodiment 1 of the present invention.

FIG. 2 illustrates in block form the environments in which to develop the program that is stored in the ROM 2 of the microcomputer. In FIG. 2, reference numeral 11 denotes the microcomputer whose configuration is shown in FIG. 1, 14 an ICE connected to an external bus of the microcomputer 11, 15 a host computer formed by a personal computer or EWS and connected to the ICE 14, 16 a user board on which the microcomputer 11 is directly loaded, and 17 a connector attached to the user board 16 for interconnecting the dedicated I/O terminal 8 and the ICE 14.

Figure 3:
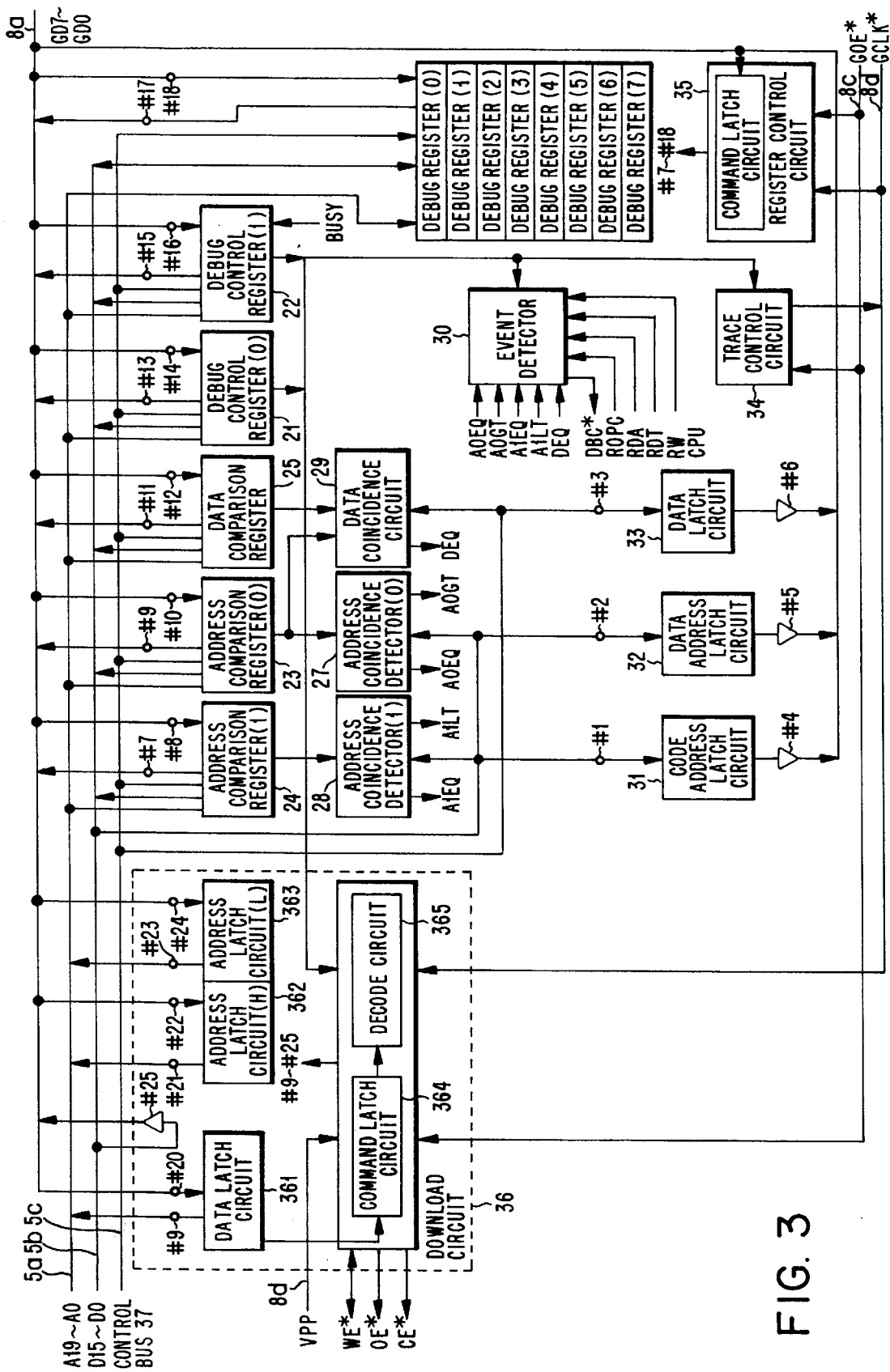
FIG. 3 is a block diagram showing the construction of a debugging circuit built in the microcomputer according to Embodiment 1 of the present invention.

FIG. 3 illustrates in block form the configuration of the debugging circuit 7 built in the microcomputer 11. In FIG. 3, reference numerals 21 denotes a debug control register (0) and 22 also a debug control register (1). The debug control registers (0) 21 and (1) 22 are connected to the CPU 1 of the microcomputer 11 via the address bus 5a (A19 to A0), the data bus 5b (D15 to D0) and the control bus 5c of the internal bus 5 so that they are accessible from the CPU 1 f or reading therefrom and writing thereto. The debug control registers (0) 21 and (1) 22 are also accessible from the ICE 14 via the GD bus 8a and the GCLK* terminal 8b. Incidentally, the debug control registers (0) 21 and (1) 22 are each formed by an 8-bit long register and capable of selecting break, trace and download facilities described later on and setting their operating conditions in accordance with the contents of respective bits.

The bit configurations of the debug control registers (0) 21 and (1) 22 are shown in FIGS. 4(1) and 4(2). In FIG. 4(1) there is shown the bit configuration of the debug control register (0) 21, in which a sixth bit is a bit for choosing whether to inhibit or permit the trace mode, a fifth bit is a bit for choosing whether to inhibit or permit the break mode, fourth to third bits are bits for choosing event detection cycles such as an operation code address, data read, data write, data read/write, and second to zeroth bits are bits for choosing break detect conditions for the detection of coincidence between address and data, the detection of address coincidence and the detection of address range. In FIG. 4(2) there is shown the bit configuration of the debug control register (1) 22, in which a fourth bit is a bit for a debug interrupt request, a third bit is a bit for a service end flag, a second bit is a bit for a service request flag, a first bit is a bit for BUSY flag and a zeroth bit is a bit for choosing whether to inhibit or permit the download mode.

In FIG. 3, reference numeral 23 denotes an address comparison register (0) and 24 another address comparison register (1). The address comparison registers (0) 23 and (1) 24 are each formed by a 20-bit long register that sets the address condition for the detection of a break in the break mode. In this instance, however, the address comparison register (0) 23 also has the function of a mask register that masks the contents of a data comparison register on a bit-wise basis as described later on. The address comparison registers (0) 23 and (1) 24 are also accessible from both of the CPU 1 and ICE 14 as is the case with the debug control registers (0) 21 and (1) 22.

Reference numeral 25 denotes the above-mentioned data comparison register, which is formed by a 16-bit long register for setting the data condition for the detection of a break in the break mode. The data comparison register 25 is also accessible from both of the CPU 1 and ICE 14.

Reference numeral 26 denotes a debug register formed by eight 8-bit long registers, which are named a debug register (0), a debug register (1), . . . , a debug register (7), respectively. The debug register 26 acts as a buffer register for exchanging data between the CPU 1 and the ICE 14 when debugging the program. Incidentally, the debug register 26 is also accessible from both of the CPU 1 and the ICE 14 for its read/write operation.

Reference numeral 27 denotes an address coincidence detector (0), which compares, as required, the contents of the address comparison register (0) 23 with an address signal (A19 to A0) output from the CPU 1 to the address bus 5a; when they coincide, an A0EQ signal goes high ("H" level) and, when the latter is larger than the former, an A0GT signal goes high. These signals A0Eq and A0GT are sent to an event detector described later on.

Reference numeral 28 denotes another address coincidence detector (1), which compares, as required, the contents of the address comparison register (1) 24 with the address signal (A19 to A0) output from the CPU 1 to the address bus 5a; when they coincide, an A1EQ signal goes high and, when latter is smaller than the former, an A1LT signal goes high. These signals A1EQ and A1LT are also sent to the event detector described later on.

Reference numeral 29 denotes a data coincidence circuit, which compares, as required, the contents of the data comparison register 25 with a signal (D15 to D0) on the data bus 5b and forces a DEQ signal to "H" level when they coincide. However, when the mode in which the facility of masking the contents of the data comparison register 25 with the contents of the address comparison register (0) 23 is chosen according to the contents of the debug control register (0) 21, the bit contents of the data comparison register 25 corresponding to those of the 15th to 0th bits of the address comparison register (0) 23 in which "1's" are set are masked when compared by the data coincidence circuit 29.

Reference numeral 30 denotes the aforementioned event detector, which receives information on the event detection permit/inhibit and kind/condition from the debug control registers (0) 21 and (1) 22 and, based on this information, receives the signals A0EQ, A0GT, A1EQ, A1LT and DEQ from the address coincidence detectors (0) 27 and (1) 28 and the data coincidence circuit 29 and monitor signals ROPC, RDA, RDT and RWCPU from the CPU 1; when it is decided based on these signals that the operation of the CPU 1 matches a specified event, the event detector 30 forces a DBC* signal to "L" level, generating a debug interrupt in the CPU 1.

Reference numeral 31 denotes a code address latch circuit, which is formed by a 20-bit long latch circuit and temporarily stores that code address of an address signal from the CPU 1 which represents the address of the program currently executed by the CPU 1. Incidentally, the contents of the code address latch circuit 31 are provided as trace information via the GD bus 8a to the ICE 14 in response to an instruction from a trace control circuit described later on when the trace facility is effective.

Reference numeral 33 denotes a data latch circuit, which is formed by a 16-bit long latch circuit and temporarily stores read-out or write data by the CPU 1 provided on the data bus 5b. The contents of the data latch circuit 33 are provided as trace information via the GD bus 8a to the ICE 14 in response to an instruction from the trace control circuit when the trace facility is effective.

Reference numeral 34 denotes a trace control circuit, which follows the contents set in the debug control registers (0) 21 and (1) 22 to once store the contents on the address bus 5a (A19 to A0) and the contents on the data bus 5b (D15 to D0), which vary with the operation of the CPU 1, in the code address latch circuit 31, the data address latch circuit 32 or the data latch circuit 33 and properly outputs therefrom the latched contents as trace information via the GD bus 8a to the ICE 14.

Reference numeral 35 denotes a register control circuit, which has a built-in command latch circuit and through which the ICE 14 effects via the GD bus 8a read/write control of the debug control register (0) 21 or (1) 22, address comparison register (1) 24, data comparison register 25 or debug register 26.

Reference numeral 36 denotes a download control circuit, which contains a data latch circuit 361, an address latch circuit (H) 362, an address latch circuit (L) 363, a command latch circuit 364 and a decode circuit 365 and which controls the download facility by which a program sent from the ICE 14 via the GD bus 8a is written into the flash memory 6 connected to the internal bus 5.

Next, a description will be given of the operation of the built-in debugging circuit 7 and its program debugging operation. The operation of the debugging circuit 7 will be described for each of its communications with the CPU 1, its communications with the ICE 14, the break facility, the trace facility and the download facility.

The operation of the debugging circuit 7 will be described first in connection with its communications with the CPU 1.

The debug control registers (0) 21 and (1) 22, the address comparison registers (0) 23 and (1) 24, the data comparison register 25 and the debug register 26 in the debugging circuit 7 built in the microcomputer 11 are all accessible from the CPU 1 for their read/write operations as described previously. These registers 21 to 26 are assigned specific addresses in the memory space and their read/write operation is performed by specifying their addresses by an ordinary read or write instruction of the CPU 1. In FIG. 5 there is shown the address assignment to the registers 21 to 26 in embodiment 1. In the illustrated example, the debug control register (0) 21 is assigned an address "00066H" and the debug control register (1) 22 an address "00067H."

Figure 6:
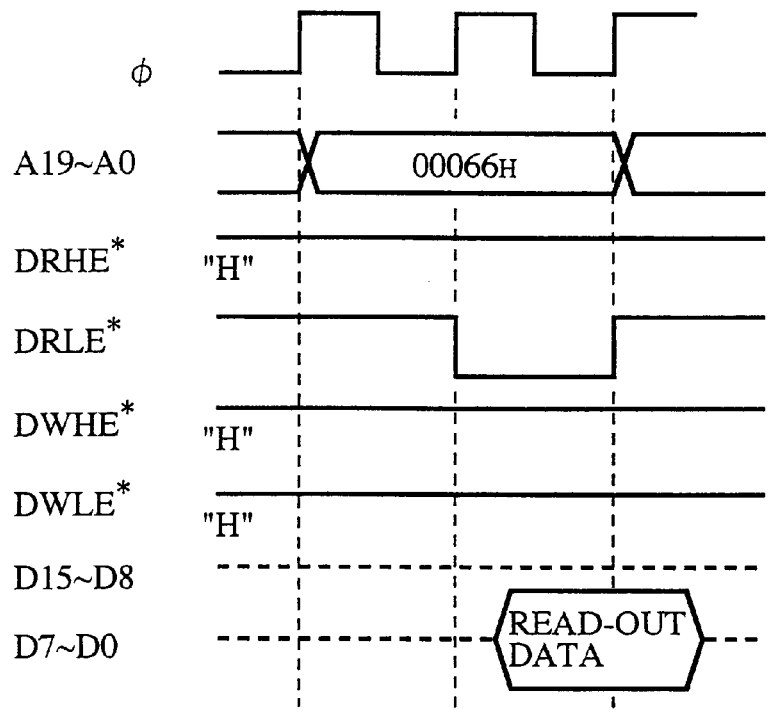
FIGS. 6(1) and 6(2) are timing charts each showing the read/write timing of each debug control register by CPU in Embodiment 1 of the present invention.
Figure 6:
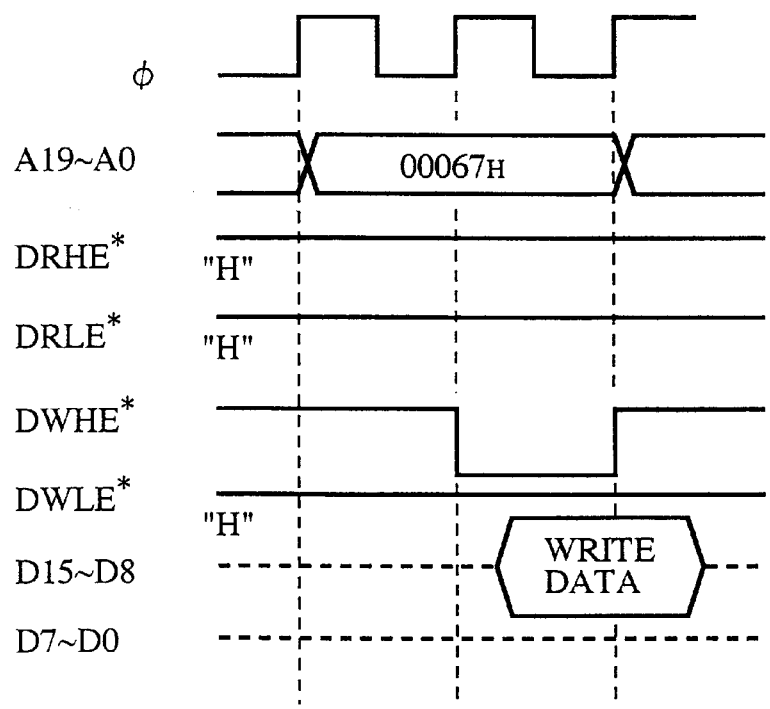

In FIGS. 6(1) and 6(2) there are shown, as examples of the write/read timing of the internal registers 21 to 26 of the debugging circuit 7 by the CPU 1, the write/read timing of the debug control registers (0) 21 and (1) 22. FIG. 6(1) shows the readout timing of the debug control register (0) 21 and FIG. 6(2) the write timing of the debug control register (1) 22.

In FIGS. 6(1) and 6(2), reference character 0 denotes a reference clock for operating the microcomputer 11, A19 to A0 addresses on the address bus 5a, DRLE*, DRHE*, DWLE* and DWHE* control signals on the control bus 5c, D7 to D0 low-order data on the data bus 5b, D15 to D8 high-order data on the data bus 5b. By the way, the registers assigned even addresses are connected to the low-order side (D7 to D0) of the data bus 5b and the registers assigned even addresses are connected to the high-order side (D15 to D8) of the data bus 5b. Accordingly, the debug control register (0) 21 assigned the address "00066H" is connected to the low-order side (D7 to D0) of the data bus 5b, whereas the debug control register (1) 22 assigned the address "00067H" is connected to the high-order side of the data bus 5b.

The control signals DRLE* and DRHE* indicate the readout timing and the control signals DWLE* and DWHE* the write timing. The signals DRLE* and DWLE* indicate the read/write timing for the low-order side of the data bus 5b and the signals DRHE* and DWHE* the read/write timing for the high-order side of the data bus 5b. Accordingly, as depicted in FIG. 6(1), when the control signal DRLE* indicating the readout timing goes low ("L"

level), data read out from the debug control register (0) 21 indicated by the address "00066H" on the address bus 5a at that time is sent to the CPU 1 via the low-order side (D7 to D0) of the data bus 5b. And, as shown in FIG. 6(2), when the control signal DWHE* indicating the write timing goes low, write data sent from the CPU 1 to the high-order side (D15 to D8) of the data bus 5b is written in the debug control register (1) 22 indicated by the address "00067H" on the address bus 5a at that time. In this way, communications are conducted between the CPU 1 and the debugging circuit 7 in the microcomputer 11.

Next, a description will be given of communications between the ICE 14 connected to the outside of the microcomputer 11 and the debugging circuit 7 built therein.

The data transfer between the ICE 14 and the registers 21 to 26 in the debugging circuit 7 is carried out using a system which interconnects the GCLK* terminal 8b, the GOE* terminal 8c and the GD bus 8a of the debugging circuit 7 and the ICE 14 and inputs commands from the ICE 14 for their read/write operation. In this instance, the signal to be applied to the GCLK* terminal 8b is a synchronizing clock from the ICE 14, and in the writing to the debugging circuit 7 data from the GD bus 8a is read into the registers 21 to 26 in synchronization with the rise-up of the synchronizing clock. In the reading from the debugging circuit 7 the data stored in the registers 21 to 26 are output via the GD bus 8a in synchronization with the fall of the synchronizing clock at the GCLK* terminal 8b. The signal that is applied to the GOE* terminal 8c is an output enable signal from the ICE 14, which is made high-level when to input data into the debugging circuit 7 from the ICE 14 and low-level when to read out data from the debugging circuit 7 to the ICE 14.

Figures 7, 8:
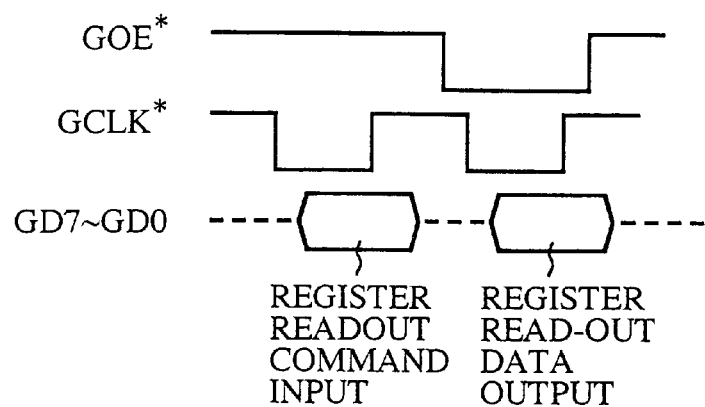
FIG. 7 is a timing chart showing the timing for reading out each register in the debugging circuit by ICE in Embodiment 1 of the present invention.
FIG. 8 is an explanatory diagram showing the format of a register read/write command in Embodiment 1 of the present invention.

In FIG. 7 there are shown timings for the ICE 14 to read out the registers 21 to 26 in the debugging circuit 7. In the first place, a register command is input from the GD bus 8a by the leading edge on the clock at the GCLK* terminal 8b. FIG. 8 is an explanatory diagram showing the format of the register read/write command; as shown, the high-order three bits (7th to 5th bits) form a command field, which indicates a readout command when they are "001." Incidentally, the low-order five bits (4th to 0th bits) form an address field, which indicates which of the registers 21 to 26 is read out.

The command input via the GD bus 8a is sent to the register control circuit 35, where it is stored in the command latch circuit. By decoding that the 7th to 5th bits of the command stored in the command latch circuit are "001," the register control circuit 35 detects that the stored command is the readout command. Next, the ICE 14 forces the signal at the GOE* terminal 8c to the low level to put the GD bus 8a in the output state and forces the synchronizing clock at the GCLK* terminal 8b to the low level. Supplied with the synchronizing clock, the register control circuit 35 sends, in synchronization with its fall, readout signals (#7, #9, #11, #13, #15, #17) that are designated by the contents of the 4th to 0th bits of the command latch circuit. As a result, the contents of the designated registers 21 to 26 are read out therefrom and sent via the GD bus 8a to the externally connected ICE 14.

Figure 9:
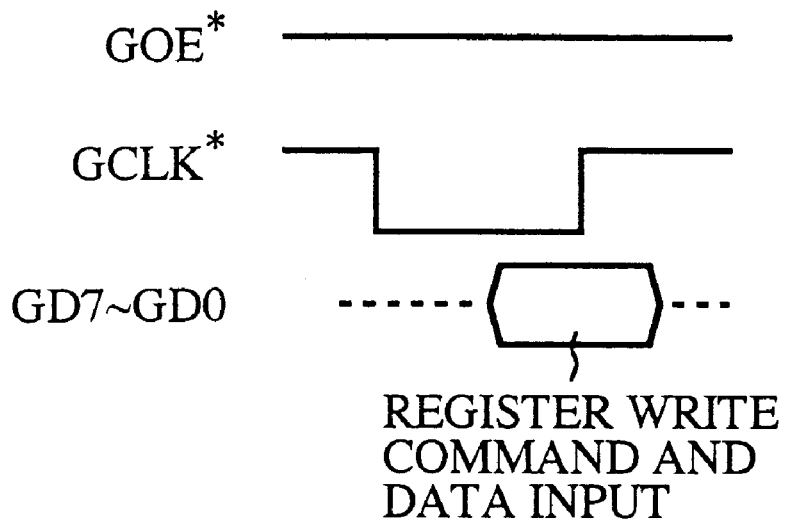
FIGS. 9(1) and 9(2) are timing charts each showing the timing for effecting a write in each register in the debugging circuit by ICE in embodiment 1 of the present invention.
Figure 9:
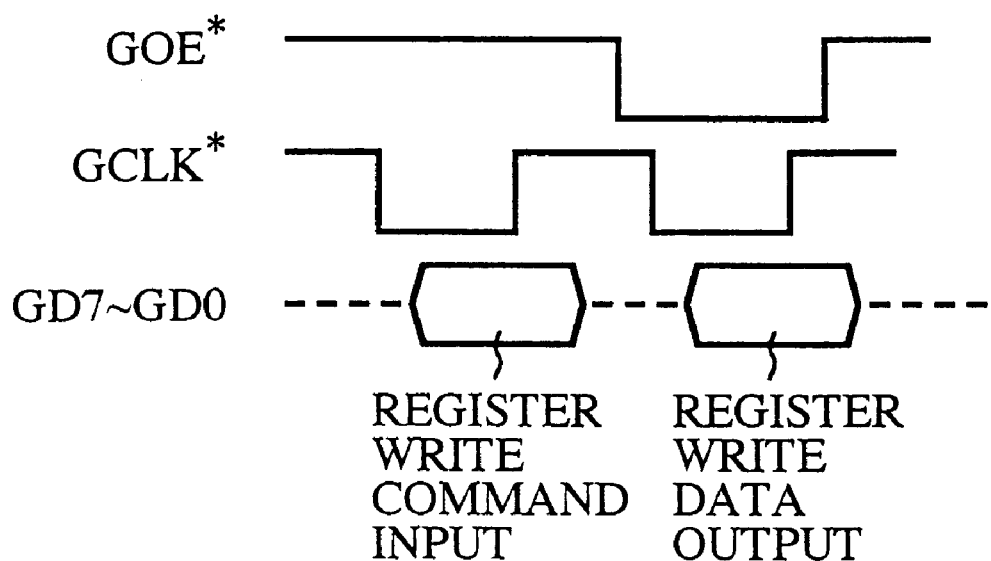

In FIGS. 9(1) and 9(2) there are shown timings for writing data into the registers 21 to 26 in the debugging circuit 7 from the ICE 14. FIG. 9(1) shows the timing for writing data into the debug control register (0) 21 or (1) 22, and FIG. 9(2) shows the timings for writing data into the address comparison registers (0) 23 and (1) 24, the data comparison register 25 and the debug register 26.

In this instance, data is written in the debug control register (0) 21 or (1) 22 by a single data input via the GD bus 8a, but the data write in the other registers 23 to 26 is carried out by inputting a register write command and write data, that is, by two input operations. Hence, as depicted in FIG. 8, the register write command for the debug control register (0) 21 has its 7th bit set at "1" and its low-order six bits used as a field for the write data, whereas the register write command for the debug control register (1) 22 has its 7th and 6th bits set at "01" and its low-order five bits used as a field for the write data. And the register write command for each of the other registers 23 to 26 has its 7th to 5th bits set at "000" and its low-order five bits used as a field indicating the address of the register.

As depicted in FIG. 9(1), upon input thereinto a command via the GD bus 8a by the leading edge on the synchronizing clock at the GCLK* terminal 8b, the register control circuit 35 stores the command in the command latch circuit and decodes its contents. If the 7th bit of the command is a "1," the register control circuit 35 decides that the command is the register write command for the debug control register (0) 21 and, sends thereto a write signal (#14). By this, the contents of the low-order seven bits (GD6 to GD0) on the GD bus 8a are written in the debug control register (0) 21. Similarly, when the 7th and 6th bits of the input command are "01," the register control circuit 35 decides that the command is the register write command, and sends a write signal (#16) to the debug control register (1) 22. By this, the contents of the low-order six bits (GD5 to GD0) on the GD bus 8a are written in the debug control register (1) 22. In this way, the write in each of the debug control registers (0) 21 and (1) 22 is performed by one input via the GD bus 8a.

On the other hand, when the contents of the 7th to $5^{th}$ bits of the command stored in the command latch circuit of the register control circuit 35 are "000," the command is a register write command for the registers 23 to 26 except the debug control registers (0) 21 and (1) 22, then it is checked which of the registers 23 to 26 the address information by the 4th to 0th bits indicates, and the register control circuit 35 waits for the next write data input. As depicted in FIG. 9(2), the ICE 14 forces the signal at the GOE* terminal 8c to the low level and the synchronizing clock at the GCLK* terminal 8b to the low level and sends the write data to the GD bus 8a in synchronization with the fall of the synchronizing clock. Upon providing the write data onto the GD bus 8a, the register control circuit 35 sends, in synchronization with the fall of the synchronizing clock, write signals (#8, #10, #12, or #18) to that one of the registers 23 to 26 which is designated by the contents of the 4th to 0th bits of the command stored in the command latch circuit.

In the way described above, communications are conducted between the ICE 14 connected to the outside of the microcomputer 11 and the debugging circuit 2 built therein.

Next, the operation of the break facility will be described.

Now, the break facility is one that the debugging circuit 7 built in the microcomputer 11 monitors the progress of execution of the user program by the CPU 1 and, when the operating condition of the CPU 1 coincides with the condition set in the debug control registers (0) 21 and (1) 22, generates a debug interrupt to suspend the user program execution.

As shown in FIG. 4(1), the 5th bit of the debug control register (0) 21 is a break mode permit bit and the break facility is effective or ineffective, depending on whether to set it at "1" or "0." The 2nd to 0th bits are break detect condition select bits, whose contents are used to select the condition for detecting the break. By the way, the break detect condition can be selected among an address-data coincidence detection, an address coincidence detection (0), an address coincidence detection (1), an address coincidence detection, an in-address-range detection and an outside-address-range detection.

The above-mentioned detections will be described below one after another.

The address-data coincidence detection is selected when the contents of the 2nd to 0th bits of the debug control register (0) 21 are "000." In this case, in the read or write of data by the CPU 1, when the read or write address therefor coincides with the contents of the address comparison register (1) 24 and the read or write data coincides with the contents of the data comparison register 25, the debugging circuit 7 generates a debug interrupt. As referred to previously, the contents of the data comparison register 25 can be masked with the contents of the address comparison register (0) 23. That is, when the low-order 16 bits of the address comparison register (0) 23 correspond to the respective bits of the data comparison register 25 and the bits of the address comparison register (0) 23 are "1's," the corresponding bits of the data comparison register 25 are masked.

The address coincidence detection (0) is selected when the contents of the 2nd to 0th bits of the debug control register (0) are "001." In this instance, a debug interrupt is generated when the output address from the CPU 1 coincides with the contents of the address comparison register (0) 23.

The address coincidence detection (1) is selected when the contents of the 2nd to 0th bits of the debug control register (0) are "010." In this case, a debug interrupt is generated when the output address from the CPU 1 coincides with the contents of the address comparison register (1) 24.

The address coincidence detection (2) is selected when the contents of the 2nd to 0th bits of the debug control register (0) 21 are "011." In this instance, a debug interrupt is generated when the output address from the CPU 1 coincides with the contents of the address comparison register (0) 23 or (1) 24.

The in-address-range detection is selected when the contents of the 2nd to 0th bits of the debug control register (0) 21 are "100." In this instance, a debug interrupt is generated when the output address from the CPU 1 is larger than the contents of the address comparison register (0) 23 and smaller than the contents of the address comparison register (1) 24.

The outside-address-range detection is selected when the contents of the 2nd to 0th bits of the debug control register (0) are "101." In this case, a debug interrupt is generated when the output address from the CPU 1 is smaller than the contents of the address comparison register (0) 23 or larger than the contents of the address comparison register (1) 24. The 4th to 3rd bits of the debug control register (0) 21 are event detection cycle select bits and the kind of the event in which to detect the break is selected according to the contents of these bits. The kind of event can be selected among an operation code address, a data readout, a data write and a data read/write.

The kinds of events will be described below one after another.

The operation code address is selected when the contents of the 4th to 3rd bits of the debug control register (0) 21 are "00." In this instance, the address for the CPU 1 to read out a first byte of an instruction, i.e. an operation code, is the object of detection under the condition selected by the break detect condition select bits that are the 2nd to 0th bits of the debug control register (0) 21.

The data readout is selected when the contents of the $4^{th}$ to 3rd bits of the debug control register (0) 21 are "01." In this case, the address or data for the CPU 1 to read out data is the object of detection under the condition selected by the break detect condition select bits that are the 2nd to 0th bits of the debug control register (0) 21.

The data write is selected when the contents of the 4th to 3rd bits of the debug control register (0) 21 are "10." In this case, the address or data for the CPU 1 to write data is the object of detection under the condition selected by the break detect condition select bits that are the 2nd to $0^{th}$ bits of the debug control register (0) 21.

The data read/write is selected when the contents of the 4th to 3rd bits of the debug control register (0) 21 are "11." In this case, the address or data for the CPU 1 to successively read/write data in a data transfer instruction, for example, is the object of detection under the condition selected by the break detect condition select bits that are the 2nd to 0th bits of the debug control register (0) 21.

Further, as mentioned previously, the contents of the address comparison registers (0) 23 and (1) 24 and the data comparison register 25 are compared in real time by the address coincidence detectors (0) 27 and (1) 28 and the data coincidence circuit 29 with the address signal (A19 to A0) on the address bus 5a and the data signal (D15 to D0) on the bus 5b which are input into and output from the CPU 1 to decide whether the former are equal to or larger or smaller than the latter. The results of comparison are sent as signals A0EQ, A0GT, A1EQ, A1LT and DEQ to the event detector 30. Based on these signals and monitor signals ROPC, RDA, RDT and RWCPU from the CPU 1 which represent its operating condition, the event detector 30 continually monitors the operating condition of the CPU 1 to see if it complies with the event kind/detect condition set in the debug control register (0) 21 and, if so, forces the DBC* signal to the low level, requesting the CPU 1 for a debug interrupt.

The above-mentioned ROPC signal is a signal that is output when the CPU 1 reads out the operation code; the RDA signal is a signal that is output when the CPU 1 outputs the data access address; the RDT signal is a signal that is output when the CPU 1 reads thereinto its read-out data; and RWCPU signal is a signal that indicates whether the data access from the CPU 1 is read (high-level) or write (low-level).

In addition to the above function of monitoring the operating condition of the CPU 1 and generating a debug interrupt when it complies with the reset condition, the break facility includes a function that the ICE 14 connected to the outside of the microcomputer 11 requests a debug interrupt at given timing regardless of the operation of the CPU 1. That is, when the ICE 14 sets a "1" in the 4th bit of the debug control register (1) 22 by the write command therefor, the event detector 30 requests the CPU 1 for a debug interrupt.

Next, the operation of the trace facility will be described.

As depicted in FIG. 4(1), the 6th bit of the debug register (0) 21 is a trace mode permit bit, and by setting this bit at "1," the trace facility becomes effective. When the trace mode permits bit is set and the signal fed to the GOE* terminal 8c goes low-level, the trace control circuit 34 outputs a clock from the GCLK* terminal 8b upon each detection of the condition for trace output and outputs trace data from the GD bus 8a in an 8-bit block in synchronization with the clock. The trace data falls into a code trace and a data trace.

The code trace outputs address information of the following contents as the trace data in accordance with the operation of the CPU 1.

(1) Program execution start address after reset
(2) Operation code address upon acceptance of an interrupt request and program execution start address of interrupt processing (3) Operation code address of a branch instruction and a branch destination address This trace data (address information) is composed of three bytes, and as shown in FIG. 10, it is output in the order of high-, mid- and low-order addresses in synchronization with the clock at the GCLK* terminal 8b. Incidentally, high-order four bits (7th to 4th bits) of the high-order address that is output in the first byte represent the trace attribute and indicates which of the contents (1), (2) and (3) the subsequent address information has, as shown in FIG. 11. And the low-order four bits (3rd to 0th bits) are addresses A19 to A16. The mid-order address that is output in the second byte represents addresses A15 to A8 and the low-order address that is output in the third byte represents addresses A7 to A0.

Figure 12:
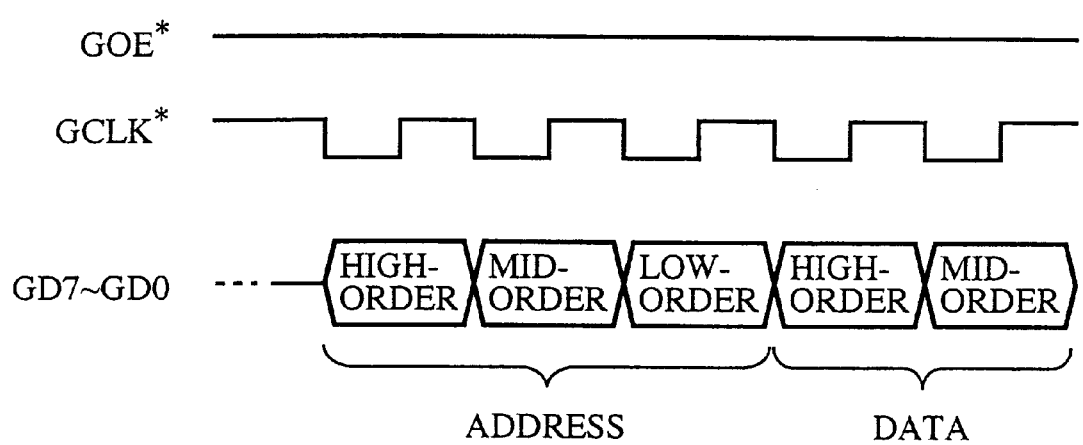
FIG. 12 is a timing chart showing an example of a trace output in the case of data read/write in data tracing in Embodiment 1 of the present invention.
Figure 13:
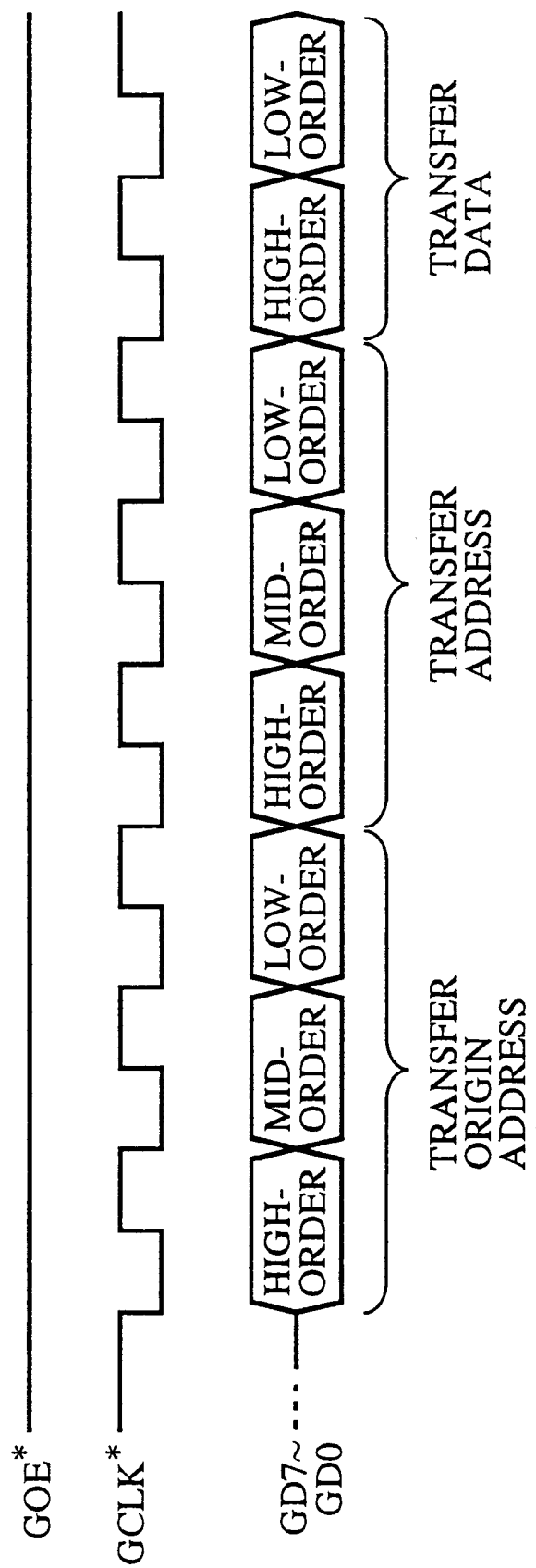
FIG. 13 is a timing chart showing an example of a trace output in the case of a data transfer instruction in of data tracing in Embodiment 1 of the present invention.

As depicted in FIG. 12 or 13, the data trace is to output, as five- or eight-byte data, the address and data for reading and writing data by the CPU 1 in synchronization with the clock at the GCLK* terminal 8b. FIG. 12 shows an example of the trace output for the data read/write, in which case trace data of five bytes is usually output. That is, in the first three bytes the high-, mid- and low-order addresses of the readout or write address are output in this order and in the last two bytes the high- and low-order data of the read or write data are output one after the other. As in the case of the code trace, the high-order four bits of the first byte represent the trace attribute and indicate the kind of data read/write as shown in FIG. 11.

In FIG. 13 there is shown an example of the trace output in the case of a data transfer instruction which involves continuous or successive read and write of data. In this instance, eight-byte trace data is output; high-, mid- and low-order addresses of a transfer origin address are output by the first three bytes, then high-, mid- and low-order addresses of a transfer destination address are output by the next three bytes, and high- and low-order data of transfer data are output by the last two bytes. In this case, too, the high-order four bits of the high-order address of each of the transfer origin address and the transfer destination address represent the trace attribute as in the case of the code trace and indicate the kind of read/write of data as shown in FIG. 11.

When it is desirable to suspend the trace output and communicate with the debugging circuit 7 from the ICE 14 side via the GD bus 8a, the ICE 14 forces the signal at the GOE* terminal 8c to the high level. When the signal at the GOE* terminal 8c goes high, the trace control circuit 34 immediately finishes the trace output and sends an acknowledge code "4XH" to the GD bus 8a in synchronization with one fall of the clock at the GCLK* terminal 8b, thereafter switching the GCLK* terminal 8b and the GD bus 8a from the output to the input state. The ICE 14 receives the acknowledge code "4XH" and detects therefrom that the GCLK* terminal 8b and the GD bus 8a are in the input state, after which it performs the read/write operation of the registers 21 to 26 in the debugging circuit 7 by the methods described previously in connection with the communications between the ICE 14 and the debugging circuit 7.

In the case of using the afore-mentioned break facility, the trace facility is also made effective usually. That is, when the event detector 30 detects the break condition during the execution of the user program and a debug interrupt request is generated, the trace control circuit 34 finishes the trace output currently under execution and outputs an acknowledge code "8XH" to the GD bus 8a in synchronization with one fall of the clock at the GCLK* terminal 8b, notifying the ICE 14 of the suspension of the user program execution because of the generation of a debug interrupt by the break detection.

Next, the operation of the download facility will be described.

The download is a function that performs read/program/erase operations of the flash memory 6 built in the microcomputer 11 via the GD bus 8a. The debugging circuit 7 follows the procedure described below to enter the download mode in which to perform the download. To begin with, the RESET* terminal 8e is made low-level to reset the microcomputer 11. In this reset state the CPU 1 of the microcomputer 11 is disconnected from the internal address bus 5a and the data bus 5b but instead it is connected to the download control circuit 36. Next, the 0th bit of the debug control register (1) 22 is set at a "1" and then the Vpp terminal 8d is switched from 0 v to 12 v. By this, the debugging circuit 7 goes into the download mode.

In the download mode, the ICE is capable of issuing four commands of read, program, program verify and auto-erase to the flash memory 6 in the microcomputer 11 via the download control circuit 36 of the debugging circuit 7.

Figure 14:
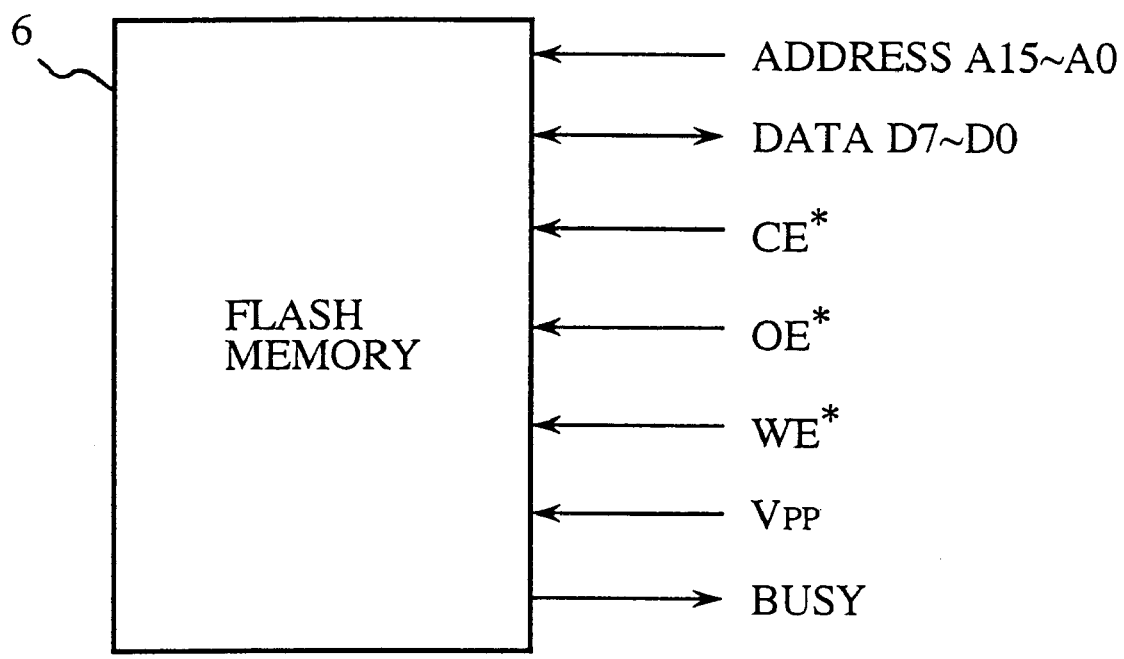
FIG. 14 is an explanatory diagram showing input-output signals of a flash memory built in the microcomputer according to Embodiment 1 of the present invention.

The flash memory 6 itself is a well-known memory already in actual use; its output signals are shown in FIG. 14. The read/write/erase operations of the flash memory 6 are performed by the address (A15 to A0) input, data (D7 to D0) input/output, control inputs CE*, OE* and WE*, Vpp input and busy (BUSY) output. Accordingly, the role of the download control circuit 36 in the debugging circuit 7 is to send data, fed thereto in units of eight bits from the ICE 14 via the GD bus 8a, to the flash memory 6 via the address bus 5a and the data bus 5b in the microcomputer 11 and to generate the signals CE*, OE* and WE* at required timings and send them to the flash memory 6. Now, a description will be given of the data input/output timing of the ICE 14 and the operation timing of signals between the download control circuit 36 and the flash memory 6 during the execution of each of the read, program, program verify and auto-erase commands.

The operation during the execution of the read command will be described first.

Figure 15:
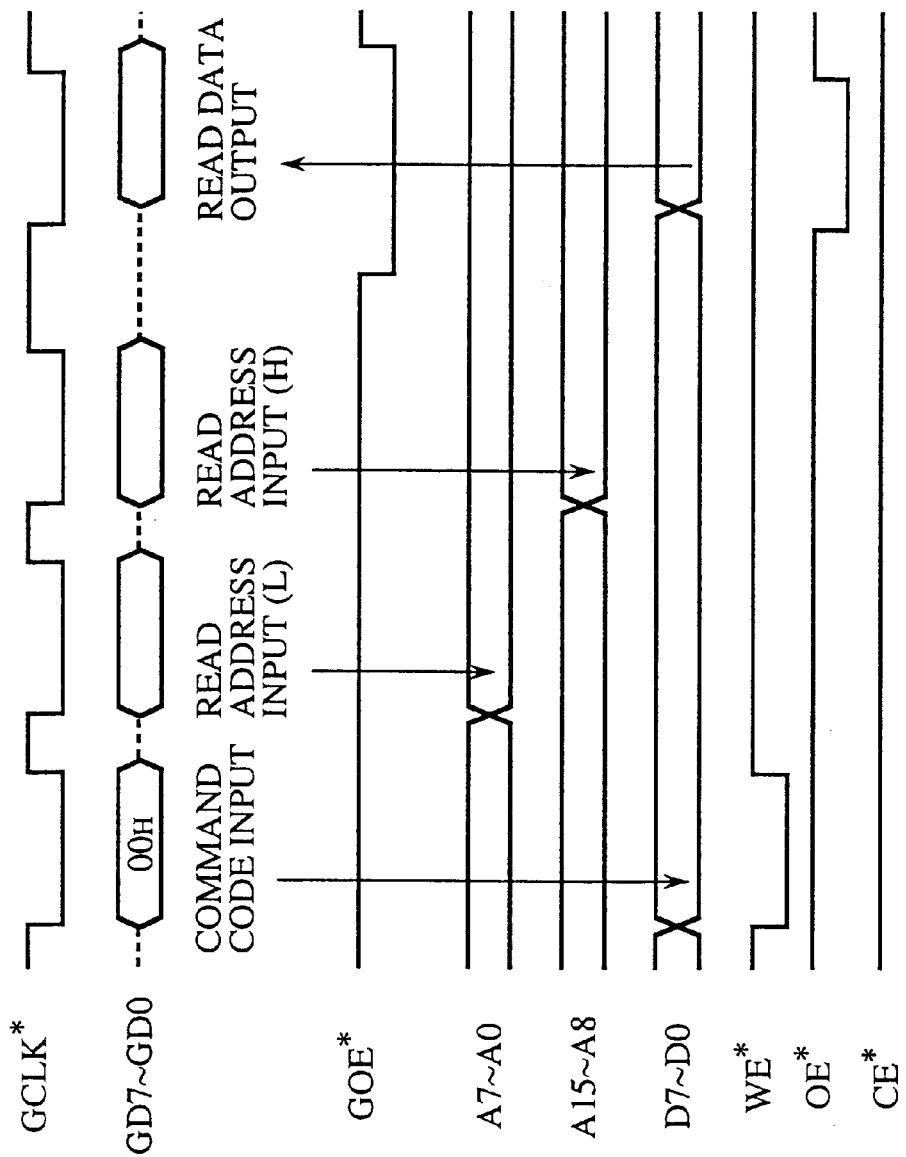
FIG. 15 is a timing chart showing the input-output timing of a download control circuit during command execution in Embodiment 1 of the present invention.

FIG. 15 is a timing chart showing the operation timing of the download control circuit 36 during the read command execution. In the first place, a command code ("00H" in the case of the read command) is input from the ICE 14 side via the GD bus 8a in synchronization with the clock at the GCLK* terminal 8b. In the download mode, the command code is latched in the data latch circuit in the download control circuit 36 and, at the same time, it is output to the low-order side (D7 to D0) of the data bus 5b. The download control circuit 36 generates the signal WE* synchronized with the clock at the GCLK* terminal 8b and sends it to the flash memory 6. The flash memory 6 latches, in synchronization with the WE* signal, the command code output on the low-order side (D7 to D0) of the data bus 5b.

At the same time, in the download control circuit 36 the contents of the data latch circuit are provided via a command latch circuit to a decode circuit, wherein they are decoded, from which it is detected that the latched command is a read command. Based on this decoded result, the second input from the ICE 14 is decided as representing the low-order side of the read address and the input is latched in the address latch circuit (L) and, at the same time, it is output to the low-order side (A7 to A0) of the address bus 5a and thence input into the flash memory 6. Further, the third input from the ICE 14 is decided as representing the high-order side of the read address and is latched in the address latch circuit (H) and, at the same time, it is output to the high-order side (A15 to A8) of the address bus 5a and thence similarly input into the flash memory 6.

Subsequent to the above operation, the ICE 14 forces the signal at the GOE* terminal 8c to the low level to put the GD bus 8a in the output state and then inputs the clock into the download control circuit 36 from the GCLK* terminal 8b. The download control circuit 36 generates the OE* signal in synchronization with the input clock and sends it to the flash memory 6. The flash memory 6 outputs, in synchronization with the OE* signal, data at the address designated by the input address to the low-order side (D7 to D0) of the data bus 5b. This data is further output to the GD bus 8a and sent to the ICE 14.

With the above operations, the ICE 14 reads out the data at the designated address of the flash memory 6 built in the microcomputer 11, that is, completes the execution of the read command.

Next, the operation during the execution of the program command will be described.

Figure 16:
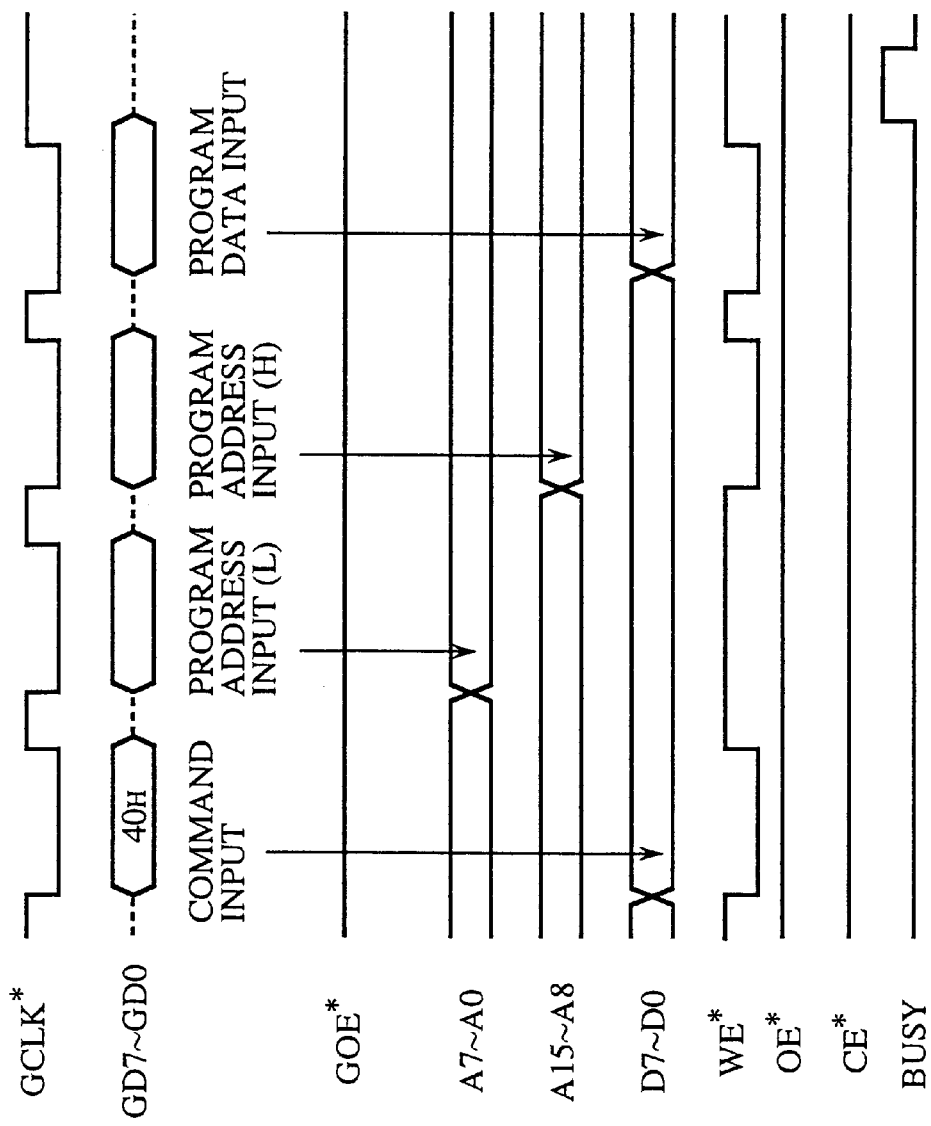
FIG. 16 is a timing chart showing the input-output timing of the download control circuit during the execution of a program command in Embodiment 1 of the present invention.

FIG. 16 is a timing chart showing the operation timing of the download control circuit 36 during the execution of the program command. The basic idea of operation is the same as that during the read command execution. That is, the download control circuit 36 inputs thereinto the command code first, then the low-order side of the program address and then the high-order side of the program address and sends them to the flash memory 6. During the execution of the program command the download control circuit 36 sends the program data by the fourth input from the ICE 14 to the debugging circuit 7. This program data is latched in the data latch circuit of the download control circuit 36 and, at the same time, it is output to the low-order side (D7 to D0) of the data bus 5b. The download circuit 36 generates the WE* signal in synchronization with the fourth clock at the GCLK* terminal 8b and sends it to the flash memory 6.

The flash memory 6 starts, at the leading edge on the WE* signal, an operation of programming the data on the low-order side (D7 to D0) of the data bus 5b in the address designated by the address input. At the start of the programming operation, the BUSY signal goes high which is output from the flash memory 6. The BUSY signal remains high during the execution of the program command but, at its completion, goes back to the low level. The BUSY signal is placed in the first bit of the debug control register (1) 22, and by repeatedly reading out this bit after issuance of the program command, the ICE 14 can detect the end of the program command.

Next, the operation during the execution of the program verify command will be described.

Figure 17:
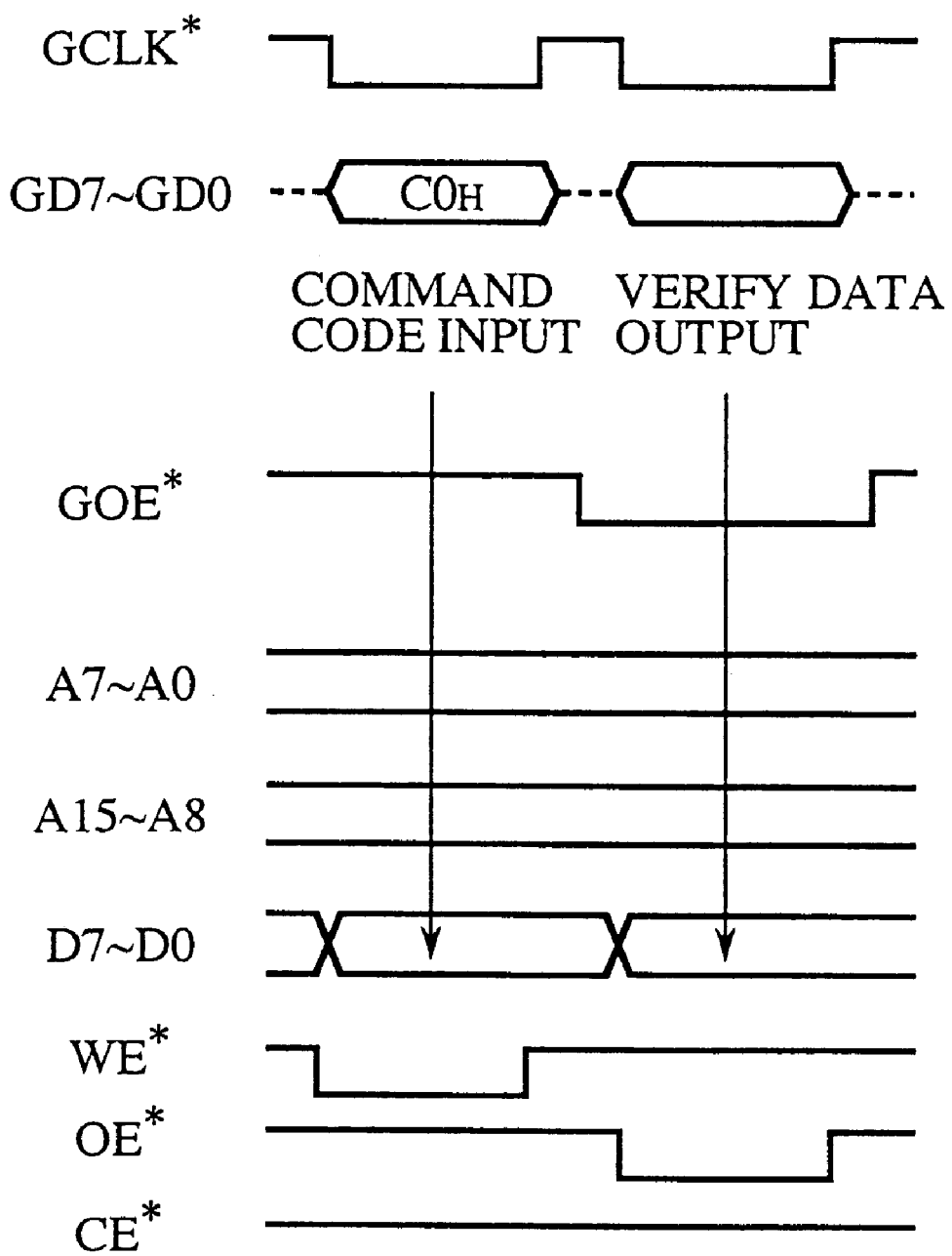
FIG. 17 is a timing chart showing the input-output timing of the download control circuit during the execution of a program verify command in Embodiment 1 of the present invention.

FIG. 17 is a timing chart showing the operation timing of the download control circuit 36 during execution of the program verify command. The program verify command is always executed paired with or simultaneously with the program command. Since the program address is latched in an internal circuit of the flash memory 6 during the execution of the program command, there is no need of newly inputting the verify address during the execution of the program verify command.

Next, the operation during the execution of the auto-erase command will be described.

Figure 18:
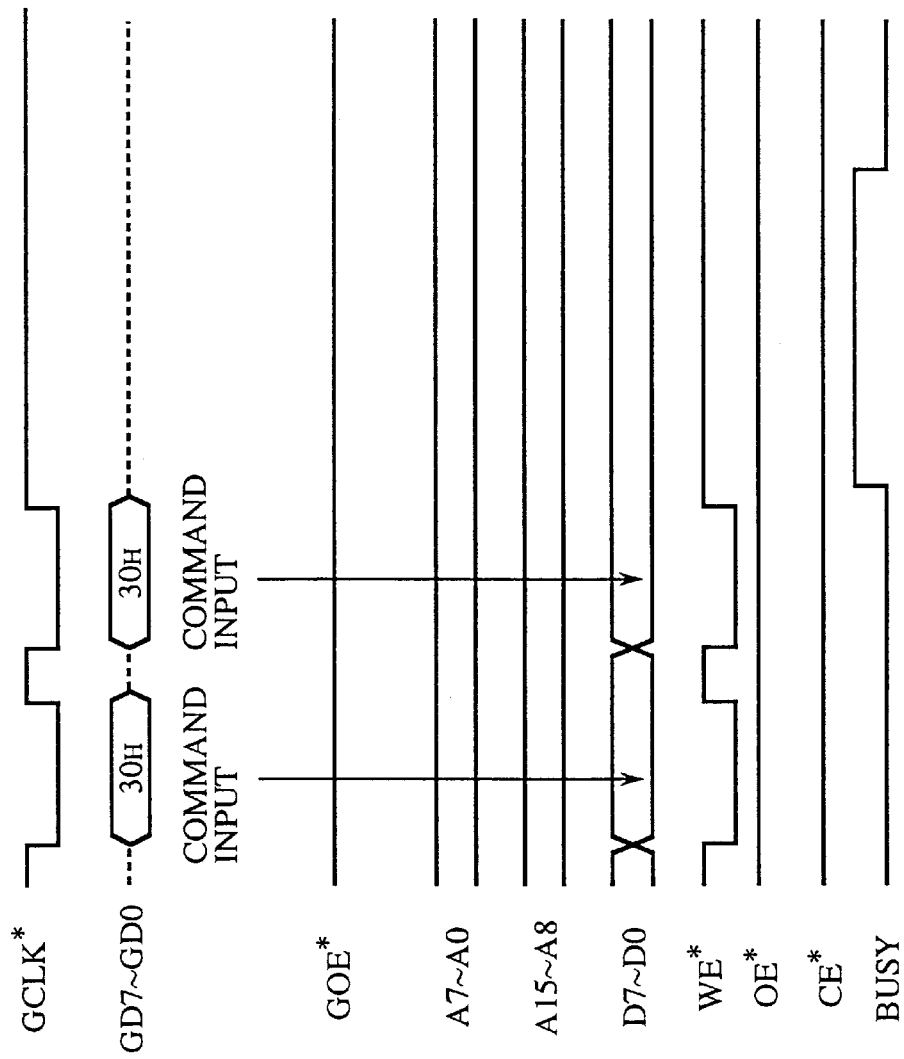
FIG. 18 is a timing chart showing the input-output timing of the download control circuit during the execution of an auto-erase command in Embodiment 1 of the present invention.

FIG. 18 is a timing chart showing the operation timing of the download control circuit 36 during the execution of the auto-erase command. In the first place, a command code "30H" is input from the ICE 14 twice in succession. This command code is sent from the data latch circuit of the download control circuit 36 to the flash memory 6 via the low-order side (D7 to D0) of the data bus 5b. The download control circuit 36 generates the WE* signal in synchronization with the second input of the clock at the GCLK* terminal 8b and sends it to the flash memory 6. In the flash memory 6 an erase operation starts in synchronization with the leading edge on the second WE* signal. Since the BUSY signal remains high during the erase operation, the ICE 14 is enabled to detect the completion of the erase operation by monitoring the BUSY signal as in the case of the execution of the program command.

Next, a description will be given of user's actual program debugging process through use of the debugging circuit 7 described above.

The system configuration for program debugging is such as shown in FIG. 2. In the first place, the user writes a program in C language, assembler language or similar language on the host computer 15 formed by a personal computer or EWS. Then the program thus prepared is compiled into a file of a hexadecimal format, which is transferred to the ICE 14. The ICE 14, which is connected via the connector 17 to the microcomputer 11 mounted directly on the user board 16, receives the compiled user program transferred thereto and writes it in the flash memory 6 of the microcomputer 11 through utilization of the download function of the debugging circuit 7.

A debug dedicated program (which will hereinafter be referred to as a debug monitor and whose role will be described later on) to be run is prepared separately of the user program and the debug monitor is downloaded in a predetermined specific area of the flash memory 6 together with the user program. That is, the user program and the debug monitor which is executed upon generation of a debug interrupt are written in the flash memory 6.

Upon completion of the download, the ICE 14 returns the Vpp terminal 8d to the Vss level (0 v), resetting the download mode. However, the signal at the RESET* terminal 8e is held low-level to keep the microcomputer 11 in the reset state. In this state, necessary conditions are set in the debug control registers (0) 21 and (1) 22, the address comparison registers (0) 23 and (1) 24 and the data comparison register 25 in the debugging circuit 7 built in the microcomputer 11.

For example, when it is desirable to check the program execution at short intervals after resetting to see if it is working well, the first step is to make the trace function effective and the next step is to set a breakpoint (a break by the operation code address) at a point where the program execution proceeds to some extent after resetting. Then, forcing the RESET* terminal 8e back to the high level by the ICE 14 after setting the above-mentioned conditions, the microcomputer 11 is reset and begins the execution of the user program. And when the user program is run to the first-set breakpoint, a debug interrupt is caused by the action of the break function, and consequently, the execution of the user program is suspended and the microcomputer 11 begins to execute the debug monitor.

The trace information on the operation of the microcomputer 11 until the suspension of the user program is sent via the GD bus 8a to the ICE 14 since the trace function is held effective, and the trace information is stored in a trace memory in the ICE 14. Accordingly, by reading out the trace information from the trace memory and displaying it through manipulation from the host computer 15 side, the user is enabled to check to see if his prepared program has correctly operated to the breakpoint after resetting.

Figure 19:
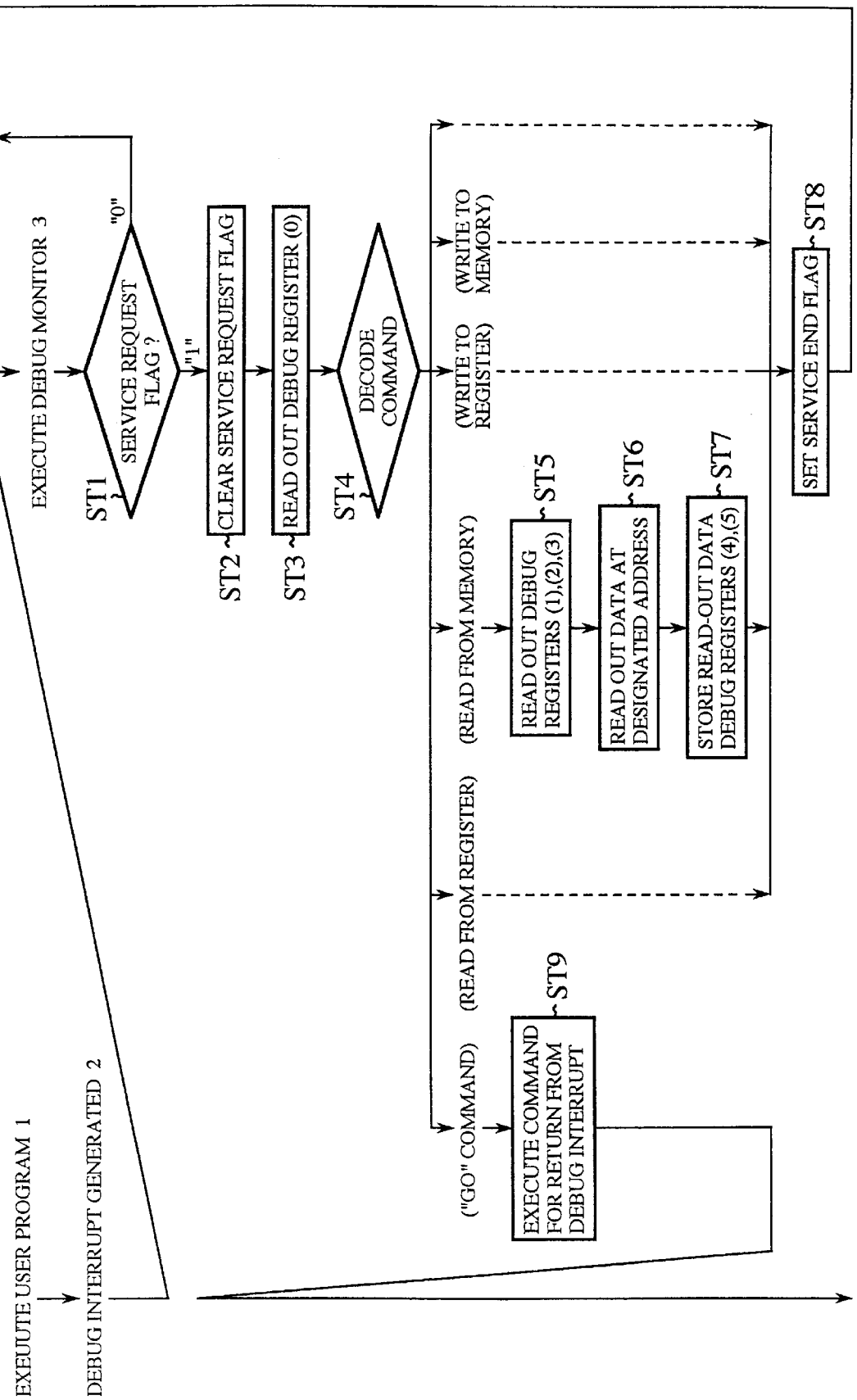
FIG. 19 is a flowchart showing the algorithm of a debug monitor in Embodiment 1 of the present invention.

Let it be assumed, for example, that it is judged from the trace result that the operation of the microcomputer 11, that is, the operation of the CPU 1 differs from the user's intended operation immediately before the breakpoint where the user program was suspended. In such a situation, the user tries to find the cause of the malfunction by sending various commands from the host computer 15 to the microcomputer 11 via the ICE 14. This make it possible to debug the user program. In this case, the afore-mentioned program called a debug monitor is used for debugging. Upon generation of the debug interrupt, the CPU 11 suspends the execution of the user program and begins the execution of the debug monitor. FIG. 19 is a flowchart showing an example of the debug monitor.

When the execution of the debug monitor begins after the generation of the debug interrupt, the CPU 1 checks a service request flag in the second bit of the debug control register (1) 22 of the debugging circuit 7 (step ST1) and, if the flag is "0," repeatedly executes the checking loop until the flag goes to "1."

On the other hand, upon generation of the debug interrupt, the trace control circuit 34 of the debugging circuit 7 outputs a break acknowledge code "8XH" after completion of the trace output under execution at that point. By this, the ICE 14 is notified of the occurrence of a break by the detection of an event and a shift of the CPU 1 to the execution of the debug monitor from the execution of the user program. Then the ICE 14 forces the signal at the GOE* terminal 8c back to the high level. The debugging circuit 7 outputs an acknowledge code "4XH" about GOE*->"H", thereafter switching the GCLK* terminal 8b and the GD bus 8a to the input state. By receiving the acknowledge code "4XH" the ICE 14 learns that it is in a state in which it is allowed to access the various registers 21 to 26 in the debugging circuit 7 by controlling the GD bus 8a, the GCLK* terminal 8b and the GOE* terminal 8c.

In this state the ICE 14 is capable of offering various commands for the user to debug the user program. Consider, for instance, the case where the suer wants to see the contents of data at a certain address in the microcomputer 11 (for example, data stored in the RAM 3 at a certain address) in the state in which the user program is being suspended by a break. In this instance, the ICE 14 first writes a memory readout command in the debug register (0) 26 of the debugging circuit 7. Which one of "00H" to "FFH" this command is assigned needs only to be predetermined between the ICE 14 and the debug monitor. Then low-, mid- and high-order addresses of the data desired to read are written into debug registers (1), (2) and (3), respectively. Next, the ICE 14 sets the second bit (a service request flag) of the debug control register (1) 22 at "1" and then repeatedly checks the content of the third bit (a service end flag) of the debug control register (1) 22. This is a loop in which the CPU 1 stays until the service request flag goes to "1" in FIG. 19.

When the service request flag is set to "1" by the above-mentioned manipulation of the ICE 14, the CPU 1 exits from the check loop and clears the request flag (step ST2) and reads out the contents of the debug register (0) 26 (step ST3). Next, the CPU 1 checks the read-out contents (decodes the read-out command) to thereby interpret the contents of the service requested by the ICE 14 and jumps to a routine in which to execute it (step ST4).

In the case of the memory readout command in this example, the CPU 1 takes out the address information from the debug registers (1), (2) and (3) 23 (step ST5) and then reads out the contents of the address designated by the address information (step ST6). Thereafter, the CPU 1 stores the low- and high-order sides of the read-out data in debug registers (4) and (5) 25, respectively (step ST7). Upon completion of the execution of the designated command, the CPU 1 sets the service end flag at "1" (step ST8) and then returns to step ST1 and enters the service request flag check loop.

By the setting of the service end flag at "1" the ICE 14 learns that its requested service (the memory readout command) has been completed and, after clearing this flag, reads out the data from the debug registers (4) and (5) in the debugging circuit 7. With such a sequence of operations, one manipulation called "memory readout" is completed. A command for reading out the contents of registers in the CPU 1 or writing designated data into registers/memories can also be implemented by the same procedure as described above.

Further, the ICE 14 offers a "GO" command and a "STOP" command. Designating the "GO" command when the debug monitor stays in the service request waiting loop, the CPU 1 executes a return command from the debug interrupt (step ST9 in FIG. 19) to finish the execution of the debug monitor and resumes the execution of the user program from where it left off. On the other hand, the "STOP" command is a command which enables the ICE 14 to force the CPU 1 to suspend the execution of the user program, starting up the debug monitor. This command is implemented by writing "1" in the fourth bit (a debug interrupt request bit) of the debug control register (1) 22 via the GD bus 8a from the ICE 14.

As described above, various functions for program debugging by the user are offered by handshaking of the ICE 14 with the debug monitor via the debug register 26.

According to Embodiment 1, the flash memory 6 built in the microcomputer 11 is used as an emulation memory, and hence it can be accessed at the same speed as that for accessing the ROM 2. This obviates the problem of the accessing speed as encountered in the conventional microcomputer with the emulation memory provided outside and not only eliminates the necessity of providing a special debug dedicated mode in the microcomputer but also permits the direct connection of the microcomputer 11 to the user board 16, making it possible to apply only signals related to the debug to the ICE 14 via the connector 17. Accordingly, the timing of input and output signals of the microcomputer 11 is free from the influence of the cable and the program development/debugging can be performed under conditions very close to the actually packaged conditions of the finished product. Moreover, since the break function by the event detection is provided in the chip of the microcomputer 11, the debug interrupt can immediately be generated upon detection of a preset event and the execution of the user program can be suspended; hence, the break can be caused without delay.

Furthermore, according to Embodiment 1, since the signal on the GD bus 8a and the signal at the GDLK* terminal 8b can be sent in two ways according to the signal level at the GOE* terminal 8c, the debug interrupt request from the external ICE 14, the output of the break generation acknowledge signal from the debugging circuit 7 in the microcomputer 11 and the output of the acknowledge code GOE*->"H" can all be carried out via the GD bus 8a—this permits minimization of the number of signal lines between the ICE 14 and the debugging circuit 7.

Embodiment 2

Figure 20:
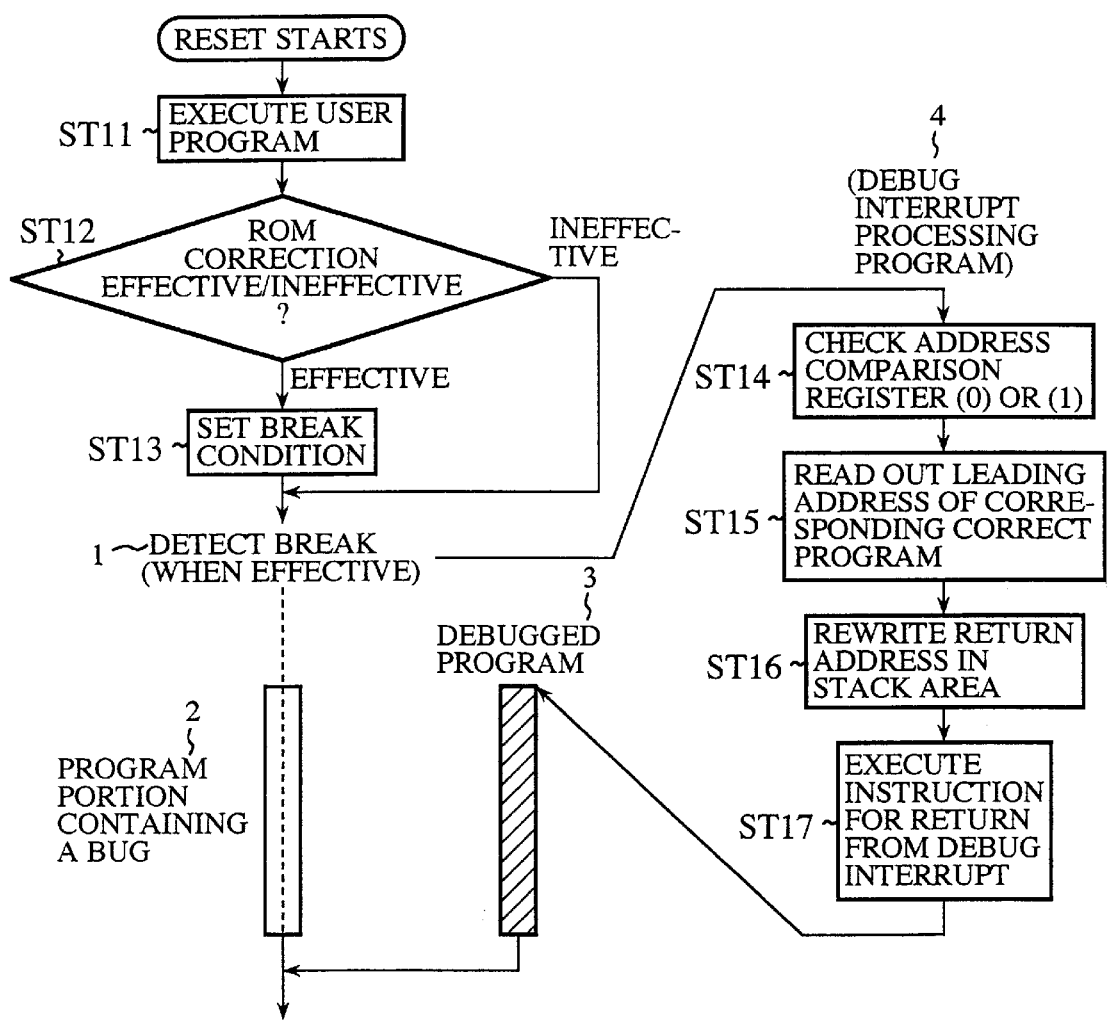
FIG. 20 is a flowchart showing ROM correction processing employing a break function of a debugging circuit of a microcomputer according to embodiment 1 of the present invention.

As referred to previously, the contents of the ROM 2 built in the microcomputer 11 are written therein during the semiconductor manufacturing process and cannot be rewritten afterward. Accordingly, there is a risk that the finished product has to be discarded if a bug is found in the program written in the ROM 2. The break function of the debugging circuit 7 described previously with reference to Embodiment 1 is also applicable to bypassing the program portion containing such a bug. FIG. 20 is a flowchart showing the procedure of "ROM correction" for bypassing the program portion containing the bug through utilization of the break function of the debugging circuit built in the microcomputer according to Embodiment 2 of the present invention.

In the first place, a flag for indicating whether or not to make the ROM correction is provided outside the microcomputer 11. For example, when a specific bits of a specific address of an external memory is "0," the ROM correction is not needed, and if the bit is "1," the ROM correction is needed; alternatively, if a certain terminal of the microcomputer 11 is at the low level, the ROM correction is not needed, and if the terminal is at the high level, the ROM correction is needed.

As depicted in FIG. 20, after reset starts, a check is made by the above-mentioned flag to determine if the ROM correction is effective or ineffective (step ST12). In the case where the ROM correction is decided as ineffective and hence is not necessary, the program initially written in the ROM 2 in the microcomputer 11 is run. In the case where the ROM correction is decided as effective and hence needs to be executed, the break condition is set (step ST13). Since the debugging circuit 7 shown in FIG. 3 has two address comparison registers (0) 23 and (1) 24, it is possible to bypass bugs at a maximum of two places. Accordingly, an example of bypassing bugs at two places will be described below. To begin with, leading addresses of the program portions containing bugs are read out from the outside and written in the address comparison registers (0) 23 and (1) 24, respectively. Then, the debug control register (0) 21 selects the operation code address by the event detection cycle select bits that are $4^{th}$ to 3rd bits of the register and selects the address coincidence detection (2) by the break detect condition select bits that are 2nd to 0th bits of the register.

When the program execution proceeds and reaches the beginning of the program portion containing a bug, a debug interrupt is generated by the break function and the debug interrupt processing program begins. The debug interrupt processing program starts with checking whether the debug interrupt has occurred in the address comparison register (0) 23 or (1) 24 (step ST14). To perform this, hardware is added which assigns an unoccupied bit of the debug control register, for example, the fifth bit of the debut control register (1) 21, to a decision bit and clears it upon occurrence of a break in the address comparison register (0) 23 and sets the decision bit when the break occurs in the address comparison register (1) 24.

Further, the address of the external memory where a correct program is stored when an interrupt is caused by the coincidence detection in the address comparison register (0) 23 and the address of the external memory where a correct program is stored when an interrupt is caused by the coincidence detection in the address comparison register (1) 24 are predetermined, and based on the result of decision in step ST14 as to whether the debug interrupt has occurred in the address comparison register (0) 23 or (1) 24, the content of the leading address of the external memory in which the corresponding correct program is stored (step ST15). When the debug interrupt processing program starts, a return address after completion of the process has already stored in a stack area, but since the return address indicates the program containing the bug, it is changed to the leading address of the correct program read out in step ST15 (step ST16). Then, the execution of a return from debug interrupt instruction (step ST17) is followed by the execution of the correct program with the bug fixed which is placed in the external memory.

Embodiment 3

While Embodiment 2 has been described in connection with the case where the break function of the debugging circuit built in the microcomputer is applied to the "ROM correction," it is also applicable to a "runaway detection." A description will be made of such Embodiment 3 of the present invention.

The function of a monitor timer is in wide use to protect the system from fatal damage by a runaway of the microcomputer. The monitor timer is a timer which measures a fixed period and, if not accessed from the CPU 1 within the period, generates an interruption dedicated to the monitor timer itself. When accessed from the CPU 1, the monitor timer is once reset and resumes therefrom counting the fixed period. The user prepares a program so that the monitor timer is accessed within the above-mentioned fixed period. By this, an access is made to the monitor timer periodically during normal operation of the program and the interruption dedicated to the monitor timer will not occur. When the microcomputer 11 runs away by some cause, no access it made to the monitor timer and consequently the monitor timer interruption develops. Upon generation of the interruption, the microcomputer 11, even in the runaway state, is sure to once branch to the monitor timer interruption program, in which the microcomputer 11 itself is subjected to resetting or similar processing to return from the runaway state.

Embodiment 3 employs the break function of the debugging circuit 7 to permit a runaway detection with a degree of accuracy equal to or higher than in the case of using the monitor timer alone. That is, the event detection cycle select bits by the 4th to 3rd bits of the debug control register (0) 21 are assigned to the operation code address and the break detect condition select bits by the 3rd to 0th bits are assigned to the outside-address-range detection. Since such setting indicates the address range in which the program is placed, the debug interrupt is generated immediately when the microcomputer 11 runs away and the execution address of the CPU 1 gets out of the preset address range. Hence, in such a case return from runaway processing needs only to be executed using the interruption processing program. When the monitor timer is used, the runaway state cannot be detected until after a certain period elapsed, but Embodiment 3 allows an early detection of the runaway and an immediate return therefrom.

The above description has been given of the preferred embodiments of the present invention, but they should be construed as being merely illustrative of the invention and it will be apparent that many modifications and variations may be effected without departing from the spirits and scope of the appended claims.

What is claimed is:

1. A microcomputer which is provided with a central processing unit that operates using a program stored in a read-only memory connected thereto via an internal bus, said microcomputer comprising:

an electrically erasable flash memory for storing an under-development version of said program which is stored in said read-only memory; and a debugging circuit connected via said internal bus to said central processing unit and having a dedicated input/output terminal for connection to an external emulator;

wherein said debugging circuit comprises:

a function of communication with said central processing unit via said internal bus;

a function of communication with said emulator via said dedicated input/output terminal;

a trace function of sending information on the operating condition of said central processing unit to said emulator via said dedicated input/output terminal;

a break function of generating a debug dedicated interrupt when the operating condition of said central processing unit meets a condition preset by said central processing unit or said emulator; and a function of writing in said flash memory a program code sent from said emulator via said dedicated input/output terminal and reading out the contents of said flash memory and sending them to said emulator via said input/output terminal.

2. A microcomputer according to claim 1, wherein said dedicated input/output terminal for connecting said built-in debugging circuit to said external emulator comprises:

a data terminal through for exchanging therethrough data in two directions between said debugging circuit and said emulator;

a clock terminal for sending therethrough a clock in said two directions for establishing synchronization in the exchange of said data through said data terminal; and a control terminal for determining the direction of propagation of signals at said data terminal and said clock terminal input from said emulator into said debugging circuit.

3. A microcomputer according to claim 1, wherein said built-in debugging circuit has a function of generating a debug dedicated interrupt when an execution address of a program code by said central processing unit coincides with a preset address; and wherein when a bug is contained in a program code of said program stored in said read-only memory, said microcomputer bypasses that program portion of said program code of said program where said bug is contained, by said debug dedicated interrupt caused by said debugging circuit and substitutes said bypassed program portion with a separately prepared correct program portion corresponding thereto.

4. A microcomputer according to claim 1, wherein said built-in debugging circuit has a function of generating a debug dedicated interrupt when an execution address of a program code by said central processing unit falls outside a preset address range; and wherein when the program execution by said central processing unit goes out of an assumed address range, said microcomputer detects a runaway by said debug dedicated interrupt generated by said debugging circuit.

* * * * *